United States Patent
Atkey

(10) Patent No.: US 9,656,756 B2
(45) Date of Patent: May 23, 2017

(54) TURBO-COMPRESSOR SYSTEM AND METHOD FOR EXTRACTING ENERGY FROM AN AIRCRAFT ENGINE

(71) Applicant: The Boeing Company, Chicago, IL (US)

(72) Inventor: Warren A. Atkey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 14/203,533

(22) Filed: Mar. 10, 2014

(65) Prior Publication Data

US 2015/0251766 A1    Sep. 10, 2015

(51) Int. Cl.
| | | |
|---|---|---|
| *B64D 13/08* | (2006.01) | |
| *F02C 7/32* | (2006.01) | |
| *F25B 27/00* | (2006.01) | |
| *F25B 31/02* | (2006.01) | |

(Continued)

(52) U.S. Cl.
CPC ............. *B64D 13/08* (2013.01); *B64D 13/06* (2013.01); *B64D 41/007* (2013.01); *F02C 7/32* (2013.01); *F25B 27/00* (2013.01); *F25B 31/026* (2013.01); *B64D 2013/0618* (2013.01); *B64D 2013/0644* (2013.01); *B64D 2013/0648* (2013.01); *B64D 2013/0688* (2013.01); *Y02T 50/56* (2013.01)

(58) Field of Classification Search
CPC .... B64D 2013/0648; B64D 2013/0618; B64D 2013/0688; B64D 13/08
See application file for complete search history.

(56) References Cited

U.S. PATENT DOCUMENTS 4,261,416 A    4/1981    Hamamoto
5,137,230 A *  8/1992    Coffinberry ............. B64C 21/06
                                                 244/118.5
5,967,461 A   10/1999    Farrington (Continued)

FOREIGN PATENT DOCUMENTS

EP    2597036 A2    5/2013
JP    2004314654    * 11/2004

OTHER PUBLICATIONS

LearnThermo.com, "2-Stage Compression with Intercooling", Jan. 4, 2013, http://www.learnthermo.com/T1-tutorial/ch08/lesson-C/pg13.php.*

(Continued)

*Primary Examiner* — Christopher P Ellis
*Assistant Examiner* — Magdalena Topolski

(57) ABSTRACT

A turbo-compressor (TC) system for extracting energy from an aircraft engine. The TC system has a TC assembly with a turbine mechanically coupled to at least one compressor. The TC system has a TC inlet in fluid communication with a bleed air system in the aircraft engine and a TC outlet in fluid communication with an air conditioning (AC) pack of an aircraft air conditioning system and configured to extract reduced temperature pack inlet air from the TC assembly into the air conditioning pack. The TC system has a ram air inlet coupled to the at least one compressor. The TC system has a TC control valve, and a TC check valve or a TC shutoff valve, both coupled to the TC assembly via a plurality of connective ducts. The TC system extracts energy from the bleed air to reduce bleed air flow and AC pack ram air usage.

24 Claims, 12 Drawing Sheets

(51) Int. Cl.
*B64D 41/00* (2006.01)
*B64D 13/06* (2006.01)

(56) References Cited

U.S. PATENT DOCUMENTS

| | | |
|---|---|---|
| 2003/0051500 A1 | 3/2003 | Asfia et al. |
| 2006/0042227 A1* | 3/2006 | Coffinberry ............... F02C 6/08 60/226.1 |
| 2008/0264084 A1* | 10/2008 | Derouineau ........... B64D 13/06 62/172 |
| 2009/0084896 A1* | 4/2009 | Boucher ................ B64D 13/08 244/118.5 |
| 2009/0326737 A1* | 12/2009 | Derouineau ........... B64D 13/06 701/3 |
| 2011/0107777 A1 | 5/2011 | Atkey et al. |
| 2011/0283713 A1 | 11/2011 | Kelnhofer |
| 2013/0187007 A1* | 7/2013 | Mackin ..................... F02C 6/08 244/134 R |
| 2014/0245775 A1* | 9/2014 | Van Lieu ............... B64D 13/08 62/401 |

OTHER PUBLICATIONS

Canadian Intellectual Property Office (CIPO) Office Action and Examination Search Report, issued Dec. 2, 2015, for corresponding Canadian patent application No. 2,875,181, Applicant the Boeing Company, 3 pages.

European Patent Office Extended European Search Report for Counterpart Patent Application No. EP14198276.9-1754, Applicant the Boeing Company, dated Aug. 13, 2015, 8 pages.

Fiterman et al., "Aircraft Air Conditioning Systems and Methods", U.S. Appl. No. 13/659,897, filed Oct. 24, 2012, 81 pages (specification and drawings).

\* cited by examiner

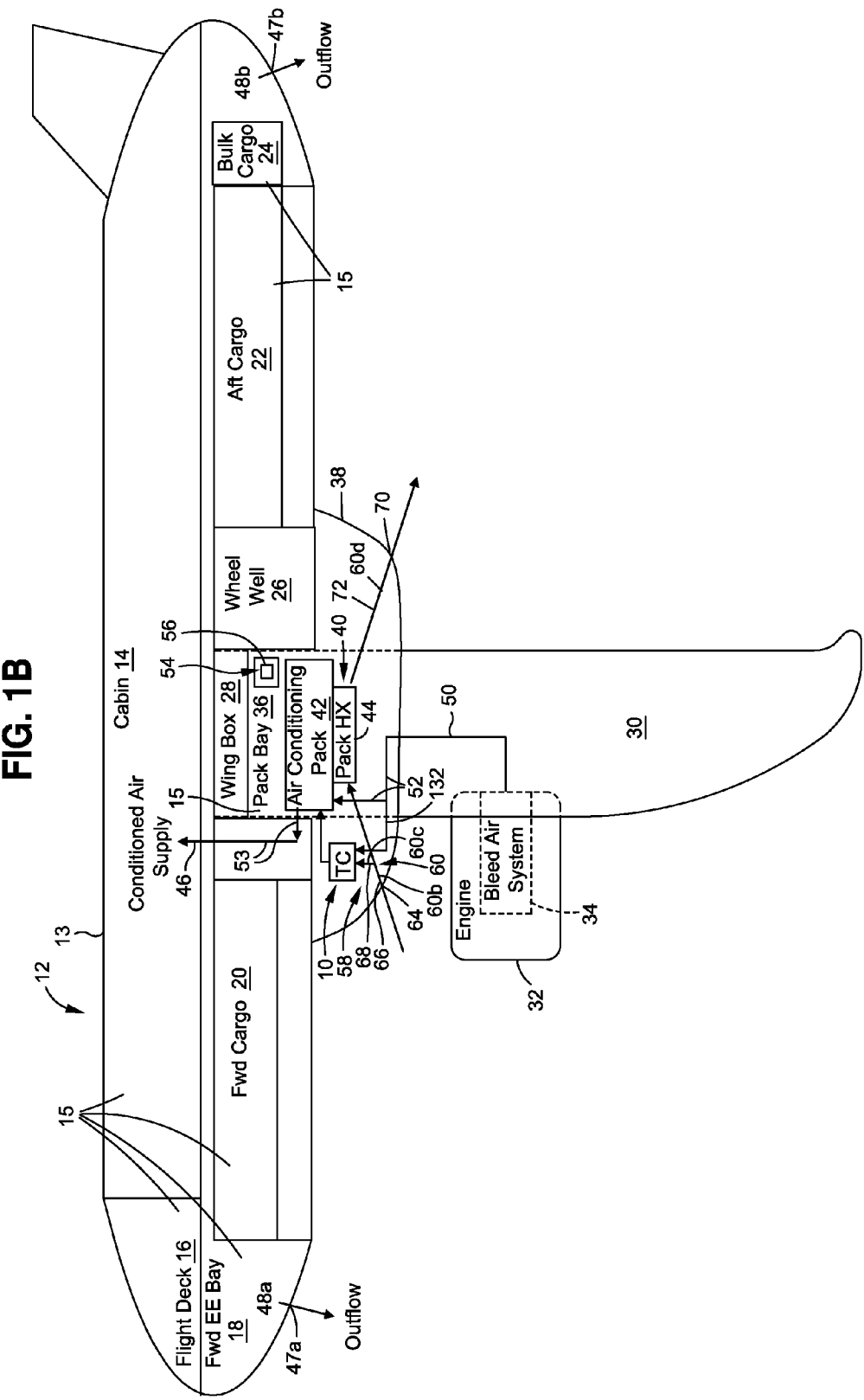

TURBO-COMPRESSOR SYSTEM AND METHOD FOR EXTRACTING ENERGY FROM AN AIRCRAFT ENGINE

BACKGROUND

1) Field of the Disclosure

The disclosure relates generally to aircraft air conditioning systems and methods, and more particularly, to aircraft air conditioning systems and methods for extracting energy from an aircraft engine in a bleed air based aircraft air conditioning system.

2) Description of Related Art

Known air conditioning systems used in transport vehicles, such as commercial aircraft, typically use an air based thermodynamic cycle to provide cool, pressurized air to various interior compartments of the aircraft, such as the passenger cabin, cargo compartments, and other interior compartments. Air from the compressor stages of the main aircraft engines, typically referred to as "bleed air", may be bled by a bleed air system from two or more of such aircraft's gas turbine engines to supply pneumatic power to various aircraft and engine systems. For example, bleed air may be used to supply pneumatic power to the aircraft air conditioning system, to an aircraft anti-ice system, to an aircraft hydraulic system, or to other aircraft systems or components.

Bleed air may typically be output at a high temperature and a high pressure from the bleed air system of the aircraft engine. Such bleed air may then be cooled and conditioned through air conditioning packs of the aircraft air conditioning system. Once the bleed air is conditioned in the air conditioning packs, it may then be distributed into the aircraft interior for aircraft interior temperature control, ventilation, and pressurization. The conditioned air within the aircraft interior may then be discharged to the outside ambient environment through various overboard valves, overflow valves and cabin leaks.

However, in known bleed based aircraft air conditioning systems, the pneumatic energy or power extracted from the bleed air provided by the bleed air system of the aircraft engine to the aircraft air conditioning system may be decoupled and not aligned with the power or energy needed by the aircraft air conditioning system to meet its flow and cooling demands. The aircraft engine may provide more power than is required by the aircraft air conditioning system power requirements. Such excess power may result in inefficiency and wasted energy. Because the aircraft air conditioning system is typically the largest energy user on the aircraft, other than the propulsion of the aircraft itself, such wasted energy may represent a significant fuel burn impact to the aircraft.

Moreover, in known bleed based aircraft air conditioning systems, the air conditioning (AC) pack of such known aircraft air conditioning systems may require increased pack ram air usage in order to adequately cool the bleed air going into the AC pack. Increased pack ram air usage, and in turn, increased ram air flow, may result in increased ram air drag to the aircraft.

Accordingly, an improved aircraft system and method for extracting energy from an aircraft engine is needed to align the pneumatic power or energy extracted from bleed air provided by the aircraft engines with the power or energy demands of the aircraft air conditioning system, thereby reducing or minimizing wasted energy by the aircraft air conditioning system, and for providing ram air drag savings.

SUMMARY

This need for an improved aircraft system and method is satisfied. As discussed in the below detailed description, embodiments of such improved aircraft system and method may provide significant advantages over existing systems and methods.

In one embodiment there is provided a turbo-compressor (TC) system for extracting energy from an aircraft engine. The turbo-compressor system comprises a turbo-compressor assembly comprising a turbine mechanically coupled to at least one compressor. The turbo-compressor assembly further comprises a turbo-compressor inlet in fluid communication with a bleed air system in the aircraft engine and configured to intake bleed air from the bleed air system into the turbo-compressor assembly. The turbo-compressor assembly further comprises a turbo-compressor outlet in fluid communication with an air conditioning pack of an aircraft air conditioning system and configured to extract reduced temperature pack inlet air from the turbo-compressor assembly into the air conditioning pack.

The turbo-compressor assembly further comprises a ram air inlet coupled to the at least one compressor and configured for intake of ram air by the at least one compressor. The turbo-compressor assembly further comprises a turbo-compressor control valve, and a turbo-compressor check valve or a turbo-compressor shutoff valve, both coupled to the turbo-compressor assembly via a plurality of connective ducts. The turbo-compressor system extracts energy from the bleed air.

In another embodiment there is provided an aircraft comprising at least one wing and one or more aircraft engines coupled to the at least one wing. Each aircraft engine has a bleed air system for generating bleed air. The aircraft further comprises a fuselage defining an interior volume having an aircraft cabin and a pack bay separate from the aircraft cabin. The aircraft further comprises an aircraft air conditioning system positioned in the pack bay and in fluid communication with the aircraft cabin.

The aircraft air conditioning system comprises an air conditioning pack and a turbo-compressor (TC) system. The turbo-compressor system comprises a turbo-compressor assembly comprising a turbine mechanically coupled to at least one compressor. The turbo-compressor system further comprises a turbo-compressor inlet in fluid communication with the bleed air system and configured to intake bleed air from the bleed air system into the turbo-compressor assembly. The turbo-compressor system further comprises a turbo-compressor outlet in fluid communication with the air conditioning pack and configured to extract reduced temperature pack inlet air from the turbo-compressor assembly into the air conditioning pack.

The turbo-compressor system further comprises a ram air inlet coupled to the at least one compressor and configured for intake of ram air by the at least one compressor. The turbo-compressor system further comprises a turbo-compressor control valve, and a turbo-compressor check valve or turbo-compressor shutoff valve, both coupled to the turbo-compressor assembly via a plurality of connective ducts. The turbo-compressor system extracts energy from the bleed air.

In another embodiment there is provided a method of extracting energy from an aircraft engine. The method comprises the step of installing a turbo-compressor (TC)

system in an aircraft air conditioning system of an aircraft. The turbo-compressor system comprises a turbo-compressor assembly disposed between a turbo-compressor inlet and a turbo-compressor outlet and comprising a turbine mechanically coupled to at least one compressor. The turbo-compressor system further comprises a ram air inlet coupled to the at least one compressor. The turbo-compressor system further comprises a turbo-compressor control valve, and a turbo-compressor check valve or a turbo-compressor shutoff valve, both coupled to the turbo-compressor assembly via a plurality of connective ducts.

The method further comprises the step of using the turbine of the turbo-compressor system to extract energy from bleed air to obtain turbine outlet air and extracted energy. The method further comprises the step of driving the at least one compressor with the extracted energy to intake and compress ram air from the ram air inlet to obtain compressor outlet air. The method further comprises the step of using the turbo-compressor system to reduce bleed air flow needed for an air conditioning pack in the aircraft air conditioning system, thus reducing power requirements for the aircraft air conditioning system. The method further comprises the step of mixing the turbine outlet air and the compressor outlet air in the turbo-compressor system to obtain reduced temperature pack inlet air and reduced air conditioning pack ram air usage.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1B is an illustration of a schematic diagram of an aircraft having an embodiment of a turbo-compressor system of the disclosure with another embodiment of a ram air inlet;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1A:
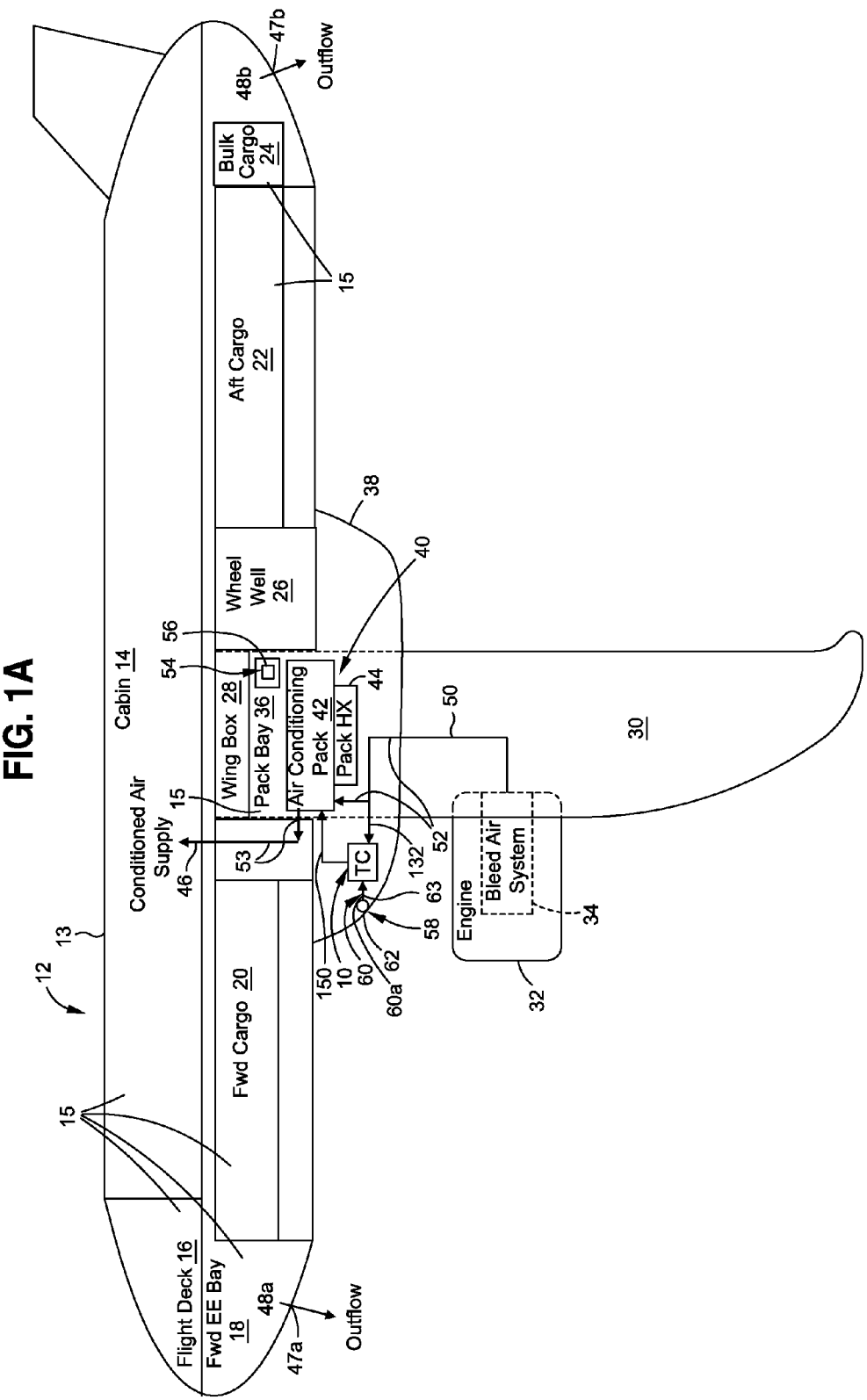
FIG. 1A is an illustration of a schematic diagram of an aircraft having an embodiment of a turbo-compressor (TC) system of the disclosure with one embodiment of a ram air inlet.

Now referring to the Figures, FIG. 1A is an illustration of a schematic diagram of an aircraft 12 having an embodiment of a turbo-compressor (TC) system 10 of the disclosure with one embodiment of a ram air inlet 58. FIG. 1B is an illustration of a schematic diagram of an aircraft 12 having an embodiment of a turbo-compressor system 10 of the disclosure with another embodiment of a ram air inlet 58. The turbo-compressor system 10 (see FIGS. 1A-8), discussed in detail below is designed to extract energy from bleed air 50 (see FIGS. 1A-8) provided by a bleed air system 34 (see FIGS. 1A-8) in an aircraft engine 32 (see FIGS. 1A-8) to an aircraft air conditioning system 40 (see FIGS. 1A-8). Further, a method 250 (see FIG. 9) of extracting energy from bleed air 50 (see FIGS. 1A-8) provided by the bleed air system 34 (see FIGS. 1A-8) in the aircraft engine 32 (see FIGS. 1A-8) to the aircraft air conditioning system 40 (see FIGS. 1A-8) using the turbo-compressor system (see FIGS. 1A-8) is disclosed.

As shown in FIGS. 1A-1B, the aircraft 12 has a fuselage 13 defining an interior volume 15. The interior volume 15 may include an aircraft cabin 14 preferably for passengers or cargo, a flight deck 16 preferably for pilots or other flight crew members, a forward electronics and equipment bay 18, a forward cargo compartment 20, an aft cargo compartment 22, and a bulk cargo compartment 24. The interior volume 15 of the aircraft 12 may further include additional cargo compartments or areas. The aircraft cabin 14 and flight deck 16 are pressurized areas with pressurized air, and the forward electronics and equipment bay 18, the forward cargo compartment 20, the aft cargo compartment 22, and the bulk cargo compartment 24 may optionally be pressurized areas with pressurized air.

The aircraft 12 further comprises a wing box 28 (see FIGS. 1A-1B) from which one or more wings 30 (see FIGS. 1A-1B) extend. FIGS. 1A-1B show one wing 30 extending from the wing box 28 and another wing 30 (not shown) extends outwardly from the opposite side of the wing box 30. As shown in FIGS. 1A-1B, the wing 30 has one or more engines 32, such as in the form of gas turbine engines. Each engine 32 may have one or more bleed air systems 34 (see FIGS. 1A-1B) coupled within the engine 32. Each bleed air system 34 has a bleed air system architecture 34a (see FIGS. 2-7B), discussed in detail below.

As shown in FIGS. 1A-1B, the interior volume 15 of the aircraft 12 further includes at least one pack bay 36. Preferably, the aircraft 12 has two pack bays 36 with one pack bay 36 positioned beneath each wing 30. However, the aircraft 12 may have additional pack bays 36 and the pack bays 36 may be located in another suitable area of the aircraft 12. The pack bay 36 is an unpressurized area with unpressurized air. The interior of the pack bay 36 may extend into the interior of an aircraft fairing 38 (see FIGS. 1A-1B), such as a wing-to-body aircraft fairing, which is a structure on the aircraft 12 positioned below the fuselage 13 and between the wings 30.

The pack bay 36 and the aircraft fairing 38 house the aircraft air conditioning system 40 (see FIGS. 1A-1B). As shown in FIGS. 1A-1B, the aircraft air conditioning system 40 comprises an embodiment of the turbo-compressor system 10, discussed in detail below, coupled to an air conditioning (AC) pack 42 having a pack heat exchanger (HX) 44 with one or more heat exchangers (not shown). The air conditioning pack 42 is preferably in the form of an air cycle system 182 (see FIG. 7A) with associated valves, ducting, sensors, and heat exchangers.

As further shown in FIGS. 1A-1B, bleed air 50 from the bleed air system 34 (i.e., pneumatic system) of the aircraft engine 32 is transported via bleed air ducts 52 to the aircraft air conditioning system 40, and in particular, to the turbo-compressor (TC) system 10 and to the air conditioning pack 42 of the aircraft air conditioning system 40.

Once the bleed air 50 (see FIGS. 1A-1B) is conditioned in the aircraft air conditioning system 40, it may then be distributed as a conditioned air supply 46 (see FIGS. 1A-1B) via air ducts 53 (see FIGS. 1A-1B) into the aircraft cabin 14 and other interior volumes 15 of the aircraft 12 for aircraft interior temperature and humidity control, ventilation, and pressurization. The conditioned air supply 46 may be discharged to the outside ambient environment or recirculated back to the aircraft air conditioning system 40. As shown in FIGS. 1A-1B, the aircraft 12 further comprises one or more outflow air valves 47a, 47b for allowing outflow air 48a, 48b to flow out of the aircraft 12. The outflow air 48a, 48b (see FIGS. 1A-1B) may comprise cabin outflow air and/or other outflow air from other areas of the aircraft 12.

As further shown in FIGS. 1A-1B, ram air 60 may be drawn into the aircraft air conditioning system 40 from outside of the aircraft 12 to be used in the air based thermodynamic cycle. For purposes of this application, "ram air" means ambient air outside of an aircraft, created by movement of the aircraft itself, that is taken into an aircraft via a ram air inlet and used in the air based thermodynamic cycle.

One example of a turbo-compressor (TC) system 10 disclosed herein may comprise in an embodiment shown in FIG. 1A, a ram air inlet 58 in the form of a ram air inlet scoop 62. As shown in FIG. 1A, the ram air inlet 58, in the form of the ram air inlet scoop 62, is configured for intake of ram air 60, such as inlet ram air 60a, by the TC system 10. The ram air inlet scoop 62 (see FIG. 1A) is a structure that may be added to the exterior of the aircraft 12 (see FIG. 1A) and may preferably be formed through the exterior of the aircraft fairing 38 (see FIG. 1A) into the interior of the aircraft fairing 38. However, the ram air inlet scoop 62 (see FIG. 1A) may also be added to other suitable locations on the aircraft 12, depending on where the TC system 10 is installed in the aircraft 12.

Figure 2:
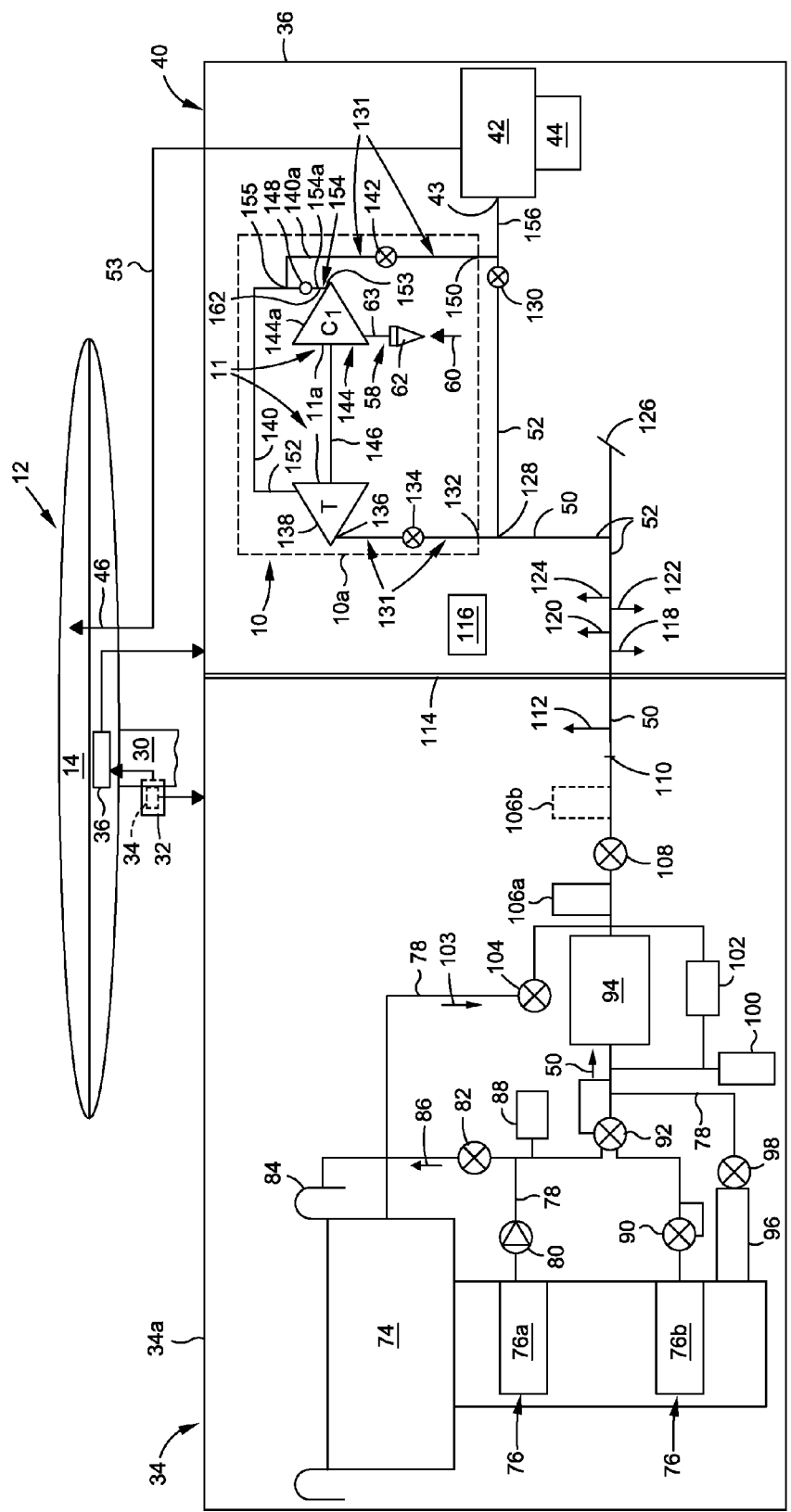
FIG. 2 is an illustration of a schematic diagram of an embodiment of a turbo-compressor (TC) system of the disclosure with a turbine, a compressor and a ram air inlet, where the TC system is shown in an aircraft air conditioning system and coupled to a bleed air system.
Figure 3:
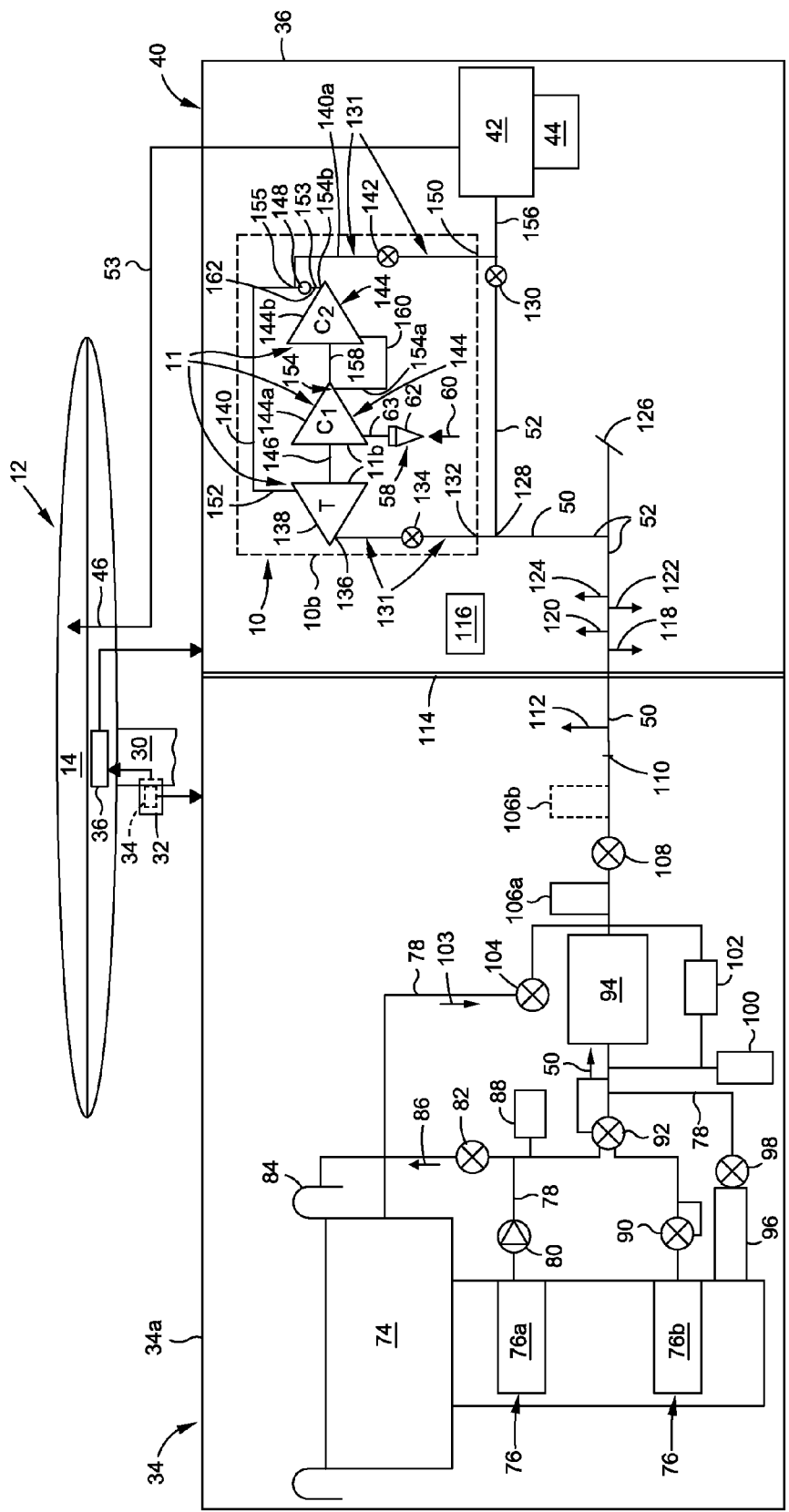
FIG. 3 is an illustration of a schematic diagram of another embodiment of a turbo-compressor (TC) system of the disclosure with a turbine, two compressors and a ram air inlet, where the TC system is shown in an aircraft air conditioning system and coupled to a bleed air system.

In the interior of the aircraft fairing 38 (see FIG. 1A), the ram air inlet scoop 62 (see FIG. 1A) is preferably coupled to a ram air inlet scoop duct 63 (see FIGS. 1A, 2), which, in turn, is coupled to a compressor 144 (see FIG. 2), such as in the form of first compressor (C1) 144a (see FIGS. 2, 3), of the TC system 10 (see FIGS. 2, 3). The ram air 60, such as in the form of inlet ram air 60a (see FIG. 1A), is preferably pulled or drawn in through the ram air inlet scoop 62 and through the ram air inlet scoop duct 63 (see FIGS. 1A, 2) by the compressor 144 (see FIG. 2), preferably in the form of first compressor (C1) 144a (see FIGS. 2, 3), which is discussed in further detail below.

The ram air inlet scoop 62 (see FIG. 1A) that is added to the aircraft 12 (see FIG. 1A) as part of the TC system 10 (see FIG. 1A) is preferably much smaller in size when compared to existing ram air inlets used with existing aircraft air conditioning packs. The ram air inlet scoop 62 (see FIG. 1A) is preferably comprised of a durable composite, metal, or other suitable material.

The ram air inlet scoop 62 (see FIG. 1A) that is added to the aircraft 12 (see FIG. 1A) as part of the TC system 10 (see FIG. 1A) may not require the addition of modulation structures, such as modulating doors or modulating vanes, and may not require the use of a modulation controller for automatically modulating the ram air inlet 58 (see FIG. 1A). For example, existing ram air inlets typically use a modulating door on the ram air inlet to control the amount of cooling air flow through primary and secondary ram air heat exchangers and/or typically use modulating vanes on the ram air exhaust to increase ram air recovery. In addition, existing ram air inlets may use a modulation controller for automatically modulating the ram air inlet while the aircraft is in flight. The ram air inlet scoop 62 (see FIG. 1A) may be added to the TC system 10 (see FIG. 1A) without such modulation.

The turbo-compressor (TC) system 10 disclosed herein may comprise in another embodiment, as shown in FIG. 1B, a ram air inlet 58 in the form of a ram air inlet bypass duct 68 coupled to the TC system 10. In this embodiment, as shown in FIG. 1B, the ram air inlet 58 of the TC system 10 taps off ram air 60 from a ram air system 64 existing in the aircraft 12 and having an existing ram air inlet duct 66 coupled to the pack heat exchanger (HX) 44 of the AC pack 42. The ram air inlet bypass duct 68 (see FIG. 1B) may be tapped off of the existing ram air inlet duct 66 so that it is integrated with a ram air system 64 existing in the aircraft 12 (see FIG. 1B). The ram air inlet bypass duct 68 (see FIG. 1B) is coupled to the TC system 10 (see FIG. 1B), and is preferably coupled to the compressor 144 (see FIG. 2), such as in the form of first compressor (C1) 144a (see FIGS. 2, 3), of the TC system 10 (see FIGS. 2, 3).

As shown in FIG. 1B, the ram air 60, such as in the form of inlet ram air 60b, flows from outside the aircraft 12 through the existing ram air inlet duct 66 of the existing ram air system 64 to the pack heat exchanger (HX) 44. As further shown in FIG. 1B, some of the ram air 60, in the form of inlet ram air 60*b*, is tapped off by the ram air inlet bypass duct 68, as bypass ram air 60*c*, and flows to the TC system 10. The inlet ram air 60*b* (see FIG. 1B) that is not tapped off flows into the pack heat exchanger 44 (see FIG. 1B) and then exits the pack heat exchanger 44 (see FIG. 1B) as outlet ram air 60*d*. As shown in FIG. 1B, the outlet ram air 60*d* flows out of the aircraft 12 through a ram air outlet 70 via a ram air outlet duct 72, both present in the ram air system 64 existing in the aircraft 12.

As further shown in FIGS. 1A-1B, the aircraft 12 further comprises one or more control systems 54 (see FIGS. 1A-1B) operably coupled or connected to the TC system 10 to control and operate the TC system 10. The one or more control systems 54 (see FIGS. 1A-1B) may also be operably coupled or connected to the AC pack 42 (see FIGS. 1A-1B) and the bleed air system 34 (see FIGS. 1A-1B) to control and operate the AC pack 42 and the bleed air system 34. The one or more control systems 54 (see FIGS. 1A-1B) may be located in the pack bay 36 (see FIGS. 1A-1B) or in another suitable location in the aircraft 12 (see FIGS. 1A-1B). The one or more control systems 54 (see FIGS. 1A-1B) may be used, for example, to enable and disable valves, switches, fans, and other various components, in order to control and regulate, for example, the amount of air flow, the temperature and pressure of the air flow, humidity, ventilation, and other applicable features. For example, the one or more control systems 54 may comprise one or more of an environmental control system with an integrated air supply control system and a cabin air conditioning and temperature control system, a mechanical control system, a pneumatic control system, a hydraulic control system, an electrical control system, or another suitable control system.

The control system 54 preferably comprises one or more controllers 56 (see FIGS. 1A-1B). The controller 56 (see FIGS. 1A-1B) may also be located in the pack bay 36 (see FIGS. 1A-1B) or in another suitable location in the aircraft 12 (see FIGS. 1A-1B). The control system 54 and controller 56 may be coupled to or connected to the TC system 10, the AC pack 42, and/or the bleed air system 34, via one or more wired control lines (not shown) or via wireless couplings or connections (not shown). The controller 56 may comprise one or more of a computer processing device with associated software, an integrated air system controller with associated software, a digital electronic controller with digital computer and associated software, an analog electronic controller with analog computer and associated software, a pneumatic controller with relay logic circuits and programmable logic controllers or computers, a pneumatic controller with air logic controls and programmable logic controllers or computers, a hydraulic controller with hardwired relay logic and programmable logic controllers or computers, or another suitable controller.

The aircraft 12 (see FIGS. 1A-1B) further comprises one or more power systems 57 (see FIG. 8) that may provide power to one or more components of the TC system 10 (see FIGS. 1A-1B), the AC pack 42 (see FIGS. 1A-1B), and the bleed air system 34 (see FIGS. 1A-1B). The one or more power systems 57 that drive one or more components of the TC system 10 (see FIGS. 1A-1B), the AC pack 42 (see FIGS. 1A-1B), and the bleed air system 34 may comprise one or more of electric power, hydraulic power, pneumatic power, shaft power, or another suitable power system.

FIGS. 2-7B show various embodiments of the turbo-compressor (TC) system 10 that is preferably installed in the aircraft air conditioning (AC) system 40 in the pack bay 36 (see FIGS. 1A-7B) of the aircraft 12 and that is coupled to one or more bleed air systems 34 (i.e., pneumatic systems) of the aircraft engines 32. The TC system 10 is preferably a flow multiplier turbo-compressor.

The TC system 10 (see FIGS. 1A-8) may be installed in a new aircraft that uses a bleed air based air conditioning system or may be retrofitted into an existing aircraft that uses a bleed air based air conditioning system. The TC system 10 (see FIGS. 1A-8) may be retrofitted into the aircraft air conditioning system of an existing aircraft that uses a bleed air based air conditioning system with minimal impact to the existing aircraft systems or only minimal modification to existing aircraft structures. For example, no hardware changes are required to be made to the existing bleed air system 34 (see FIGS. 1A-8) or to the existing AC pack 42 (see FIGS. 1A-8). The specific application of one embodiment of the turbo-compressor system 10 (see FIGS. 1A-8) over another may depend on the architecture and size of the aircraft, whether the aircraft is a new design or an existing design, or design considerations of the aircraft.

FIGS. 2-7B show an embodiment of the air conditioning (AC) pack 42 with the pack heat exchanger (HX) 44. As used herein, the term "air conditioning (AC) pack" means a device or system that conditions pressurized air intended to be supplied to an aircraft, where the pressurized air is conditioned for temperature via a cooling cycle system. The AC pack 42 may comprise further components such as valves, ducts, controllers, and other components known in the art. The AC pack 42 (see FIGS. 1A-1B) used in embodiments of the aircraft air conditioning system 40 (see FIGS. 1A-1B) disclosed herein provides pressurization, ventilation and temperature control to the aircraft 12 (see FIGS. 1A-1B) throughout the aircraft's entire operation, including at sea level and at cruise level. Embodiments of the TC system 10 disclosed herein may also be used with other known AC packs containing mechanical components known in the art.

FIGS. 2-7B show an embodiment of a bleed air system architecture 34*a* of the bleed air system 34 (i.e., pneumatic system) that is known and that provides the bleed air 50 (see FIG. 2) to the TC system 10 (see FIG. 2). The bleed air system architecture 34*a* of the bleed air system 34 shown in FIGS. 2-7B is an exemplary embodiment of the bleed air system architecture that may be used with the TC system 10 disclosed herein, and is not meant to be limiting and should not be construed as limited to this embodiment. Rather, other suitable bleed air system architectures of bleed air systems known in the art may be used that provide bleed air 50 to the TC system 10 disclosed herein.

As shown in FIGS. 2-7B, the bleed air system architecture 34*a* includes an engine fan 74 with compressor stage bleed ports 76. Air drawn into the aircraft engine 32 is preferably bled from a compressor stage of the aircraft engine 32 with the compressor stage bleed ports 76. Although only two compressor stage bleed ports 76 are shown in FIGS. 2-7B, additional compressor stage bleed ports 76 may be used. For purposes of this application, "bleed air" means outside air drawn into an aircraft engine, such as an aircraft gas turbine engine, that is compressed at a compressor stage of the aircraft engine and that is used as a source of energy or power to an aircraft air conditioning system and that may also be used in other systems or components in the aircraft. The turbo-compressor system 10 and the aircraft air conditioning system 40, as shown in FIGS. 2-7B, may be referred to as bleed air based systems.

In the bleed air system 34 (see FIGS. 2-7B), a high pressure bleed port 76*b* (see FIGS. 2-7B) may be used to draw in and compress the air when the aircraft engine 32 (see FIG. 2) is at low thrust. As thrust is increased, the pressure from the high pressure bleed port 76*b* (see FIGS. 2-7B) rises, and a high pressure shutoff valve (HPSOV) 90 (see FIGS. 2-7B) closes. The bleed air is then drawn from a low pressure bleed port 76*a* (see FIGS. 2-7B) through an intermediate pressure check valve 80 (see FIGS. 2-7B).

The bleed air system 34 (see FIGS. 2-7B) preferably controls bleed air pressure 234 (see FIG. 8) to a set point. At the low pressure bleed port 76*a* (see FIGS. 2-7B), air is bled in the cruise mode of the aircraft 12 (see FIGS. 2-7B), whereas the high pressure bleed port 76*b* (see FIGS. 2-7B) may be closed and may typically only be used for conditions on ground or descent when the engine 32 (see FIGS. 2-7B) is idling.

In the bleed air system 34 (see FIGS. 2-7B), the bleed air that has been compressed may be drawn through bleed air ducting 78 (see FIGS. 2-7B) throughout the bleed air system 34 (see FIGS. 2-7B). Inlet cowl lip bleed air 86 (see FIGS. 2-7B) may flow through an engine anti-ice valve 82 (see FIGS. 2-7B) to an inlet cowl lip 84 (see FIGS. 2-7B) to provide anti-icing protection to the inlet cowl lip 84 (see FIGS. 2-7B).

As shown in FIGS. 2-7B, the bleed air system architecture 34*a* of the bleed air system 34 may further include an intermediate pressure sensor 88, a pressure regulating shut-off valve (PRSOV) 92, a precooler 94, a starter 96, a starter valve 98, a bleed manifold pressure sensor 100, a delta pressure sensor 102, a fan air modulating valve (FAMV) 104, an outboard strut manifold temperature sensor 106*a*, an inboard strut manifold temperature sensor 106*b*, and an over pressure valve (OPV) 110.

Bleed air pressure 234 (see FIG. 8) may be controlled with the pressure regulating shutoff valve (PRSOV) 92 (see FIGS. 2-7B) and the over pressure valve (OPV) 110 (see FIGS. 2-7B). Bleed air temperature 235 (see FIG. 8) may be controlled with the FAMV 104. To obtain a desired bleed air temperature, the bleed air 50 (see FIGS. 2-7B) is preferably passed through the precooler 94 (see FIGS. 2-7B), which may be in the form of a heat exchanger. Engine fan air 103 (see FIGS. 2-7B) from the engine fan 74 (see FIGS. 2-7B) may be blown through the precooler 94 (see FIGS. 2-7B) and modulated by the fan air modulating valve (FAMV) 104 (see FIGS. 2-7B) to control the bleed air temperature 235 (see FIG. 8) of the bleed air 50 (see FIGS. 2-7).

As further shown in FIGS. 2-7B, a strut/wing leading edge 114 may separate the bleed air system 34 located in the aircraft engine 32 on the wing 30 from the aircraft air conditioning system 40 located in the pack bay 36 of the aircraft 12. The bleed air 50 (see FIGS. 2-7B) exits the bleed air system 34 (see FIGS. 2-7B) located in the aircraft engine 32 (see FIGS. 2-7B) via a bleed air system outlet 110 (see FIGS. 2-7B). Bleed air 50 (see FIGS. 2-7B) that does not exit the bleed air system 34 (see FIGS. 2-7B) located in the aircraft engine 32 (see FIGS. 2-7B) may be transported and used in a wing/thermal anti-icing system 112 (see FIGS. 2-7B). Bleed air 50 (see FIGS. 2-7B) that enters the pack bay 36 (see FIGS. 2-7B) and other areas of the aircraft 12 (see FIGS. 2-7B) may be transported via pack bay/fuselage bleed air ducting 116 (see FIGS. 2-7B) for use by various systems and components throughout the aircraft 12 (see FIGS. 2-7). As shown in FIGS. 2-7B, besides being transported and used by the TC system 10 disclosed herein, the bleed air 50 may also be transported and used, for example, by an air-driven pump (ADP) 118, a total air temperature probe 120, potable water 122, a hydraulic reservoir 124, a bleed air component 126 on the opposite side of the aircraft 12, or another suitable system or component in the aircraft 12.

The bleed air 50 (see FIGS. 2-7B) is preferably transported via bleed air ducts 52 (see FIGS. 2-7) to the aircraft air conditioning system 40 (see FIGS. 2-7B). As shown in FIGS. 2-7B, at a bypass intersection 128, the bleed air 50 is transported to the TC system 10 (see FIGS. 2-7B) in one direction and the bleed air 50 is transported to the air conditioning (AC) pack 42 (see FIGS. 2-7B) through a pack flow control valve (FCV) 130 in another direction. The quantity of bleed air 50 (see FIGS. 2-7B) flowing to the AC pack 42 (see FIGS. 2-7B) is regulated by the pack FCV 130 (see FIGS. 2-7B). Preferably, one pack FCV 130 (see FIGS. 2-7B) may be installed for each AC pack 42 (see FIGS. 2-7B), although additional pack FCVs 130 may be installed if needed. As shown in FIGS. 2-7B, the TC system 10 is preferably positioned to operate in parallel with the pack FCV 130 for the AC pack 42.

As shown in FIGS. 2-7B, each of the embodiments of the TC system 10, 10*a*-10*f*, comprises a turbo-compressor (TC) inlet 132 in fluid communication with the bleed air system 34 in the aircraft engine 32 and configured to intake bleed air 50 from the bleed air system 34 into a turbo-compressor (TC) assembly 11 of the TC system 10. The TC inlet 132, as shown in FIGS. 2-7B, is in fluid communication with the bleed air system 34 via the bleed air ducts 52 and via a plurality of connective ducts 131 in the TC system 10.

As further shown in FIGS. 2-7B, each of the embodiments of the TC system 10, 10*a*-10*f*, comprises a turbo-compressor (TC) outlet 150 in fluid communication with the AC pack 42 of the aircraft air conditioning system 40 and configured to extract a reduced temperature pack inlet air 156 from the TC assembly 11 into the AC pack 42. The TC outlet 150, as shown in FIGS. 2-7B, is in fluid communication with the AC pack 42 via the plurality of connective ducts 131.

As further shown in FIGS. 2-7B, each of the embodiments of the TC system 10, 10*a*-10*f*, comprises a turbo-compressor control valve (TCCV) 134 coupled to the TC assembly 11 via the plurality of connective ducts 131, and comprises a turbo-compressor (TC) valve 142 coupled to the TC assembly 11 via the plurality of connective ducts 131. The TC valve 142 (see FIG. 8) may comprise a TC check valve 142*a* (see FIG. 8), a TC shutoff valve 142*b* (see FIG. 8), or another suitable TC valve. The TCCV 134 (see FIGS. 2-7B) and the TC valve 142 (see FIGS. 2-7B) may be added to the TC system (see FIGS. 2-7B) in order to isolate the TC assembly 11 (see FIGS. 2-7B) and the TC system 10 (see FIGS. 2-7B) from the AC pack 42 (see FIGS. 2-7B), from the bleed air system 34 (see FIGS. 2-7B), and from other systems in the aircraft 12.

As further shown in FIGS. 2-6, embodiments of the TC system 10, 10*a*-10*e*, may optionally comprise one or more temperature sensors 148 coupled to the TC assembly 11. Preferably, the one or more temperature sensors 148 (see FIGS. 2-6) may be used to sense if compressor outlet air 154 (see FIGS. 2-6) from the compressor 144 (see FIGS. 2-6) is too hot and may be used to provide overheat protection of the compressor outlet air 154 (see FIGS. 2-6). Additionally, the TC system 10, 10*a*-10*f* (see FIGS. 2-7B) may optionally comprise additional pressure and temperature sensors (not shown) at the TC inlet 132 (see FIGS. 2-7B), at the TC outlet 150 (see FIGS. 2-7B), at the turbine 138 (see FIGS. 2-7B) inlet and outlet, at the TCCV 134 (see FIGS. 1-7B), at the TC valve 142 (see FIGS. 2-7B), or at other locations within the TC system 10, 10*a*-10*f* (see FIGS. 2-7B). Optionally, the TC system 10, 10*a*-10*f* (see FIGS. 2-7B) may further comprise cooling elements (not shown) to provide cooling of one or more components of the TC assembly 11, 11a-11f (see FIGS. 2-7B).

As further shown in FIGS. 2-7B, each of the embodiments of the TC system 10, 10a-10f, comprises a turbo-compressor assembly 11 comprising a turbine 138 mechanically coupled to at least one compressor 144. The turbine 138 (see FIGS. 2-7B) of the TC system 10 (see FIGS. 2-7B) extracts extracted energy 238 (see FIG. 8) from the bleed air 50 (see FIG. 8) to reduce bleed air flow 236 (see FIG. 8) and bleed air pressure 234 (see FIG. 8) needed for the AC pack 42 (see FIGS. 2-6) (or air cycle system 182 in FIG. 7A), resulting in reduced power requirements 232 (see FIG. 8) for the aircraft air conditioning system 40 (see FIGS. 2-7B) and reduced air conditioning pack ram air usage 157 (see FIG. 8). As discussed above, the TC assembly 11 (see FIG. 8) further comprises a ram air inlet 58 (see FIG. 8) coupled to the at least one compressor 144 (see FIG. 8) and configured for intake of ram air 60 (see FIG. 8) by the at least one compressor 144 (see FIG. 8).

FIG. 2 is an illustration of a schematic diagram of one embodiment of a turbo-compressor (TC) system 10, such as in the form of TC system 10a, having an embodiment of a TC assembly 11, such as in the form of TC assembly 11a. In this embodiment, as shown in FIG. 2, the TC assembly 11, such as in the form of TC assembly 11a, comprises a turbine 138 mechanically coupled to at least one compressor 144 via a shaft 146. Preferably, in this embodiment, the TC assembly 11 (see FIG. 2), such as in the form of TC assembly 11a (see FIG. 2), has one compressor 144 (see FIG. 2), such as a first compressor (C1) 144a (see FIG. 2).

The turbine 138 (see FIG. 2) has a turbine inlet 136 (see FIG. 2) for receiving the bleed air 50 transported through the plurality of connective ducts 131 (see FIG. 2) in the TC system 10 (see FIG. 2) and bleed air ducts 52 (see FIG. 2) from the bleed air system 34 (see FIG. 2). The turbine 138 (see FIG. 2) expands the bleed air 50 (see FIG. 2) through the turbine 138 (see FIG. 2) and extracts extracted energy 238 (see FIG. 8) from the bleed air 50 (see FIG. 2) passing through the turbine 138 (see FIG. 2) to generate power 240 (see FIG. 8), such as pneumatic power 242 (see FIG. 8), to drive the compressor 144. As shown by FIG. 2, the turbine 138 generates turbine outlet air 152 which flows out of the turbine 138 (see FIG. 2) via outlet duct 140 (see FIG. 2).

The TC assembly 11 (see FIGS. 2-7B) and TC system 10 (see FIGS. 2-7B) use the turbine 138 (see FIGS. 2-7B) to pull energy from the bleed air 50 (see FIGS. 2-7B) to reduce bleed air flow 236 (see FIG. 8) and bleed air pressure 234 (see FIG. 8) needed for the AC pack 42 (see FIGS. 2-7B), and to take the extracted energy 238 (see FIG. 8) from the turbine 138 (see FIGS. 2-7B) to pull in ram air 60 (see FIGS. 2-5, 7B) and mix with turbine outlet air 152 (see FIGS. 2-5, 7B) to generate a reduced temperature pack inlet air 156 (see FIGS. 2-3) entering the AC pack 42 (see FIGS. 2-3).

As shown in FIG. 2, the compressor 144 may intake ram air 60 via the ram air inlet 58 coupled to the compressor 144. The ram air inlet 58 (see FIG. 2) coupled to the compressor 144 (see FIG. 2) is preferably configured for intake of the ram air 60 (see FIG. 2) by the at least one compressor 144 (see FIG. 2).

FIG. 2 shows the embodiment of the ram air inlet 58 in the form of ram air inlet scoop 62 with ram air inlet scoop duct 63, as discussed above and also shown in FIG. 1A. However, the ram air inlet 58 in the form of ram air inlet bypass duct 68 (see FIG. 1B), as discussed above and shown in FIG. 1B, may also be used with this embodiment of the TC assembly 11, such as in the form of TC assembly 11a.

The compressor 144 (see FIG. 2) compresses the ram air 60 and generates compressor outlet air 154 (see FIG. 2), such as first compressor outlet air 154a (see FIG. 2), through compressor outlet 162 (see FIG. 2). As shown in FIG. 2, temperature sensor 148 is positioned at or near the compressor outlet 162 of the compressor 144 and preferably provides overheat protection of the compressor outlet air 154.

The turbine outlet air 152 (see FIG. 2) is mixed or blended with the compressor outlet air 154 (see FIG. 2) to form turbo-compressor (TC) outlet air 155 (see FIG. 2). The TC outlet air 155 (see FIG. 2) may be transported via the plurality of connective ducts 131 (see FIG. 2), such as in the form of outlet duct 140a (see FIG. 2), and through the TC outlet 150 (see FIG. 2). Because the turbine outlet air 152 (see FIG. 2) has had energy extracted from it by the turbine 138 (see FIG. 2), this results in the turbine outlet air 152 having a lower temperature than the bleed air temperature 235 (see FIG. 8) of the bleed air 50 (see FIG. 2) coming into the TC system 10 (see FIG. 2) from the bleed air system 34 (see FIG. 2).

The compressor outlet air 154 (see FIG. 2) is comprised of the ram air 60 (see FIG. 2) that has been compressed by the compressor 144 (see FIG. 2) and brought up to a pressure needed for the AC pack 42 (see FIG. 2). Thus, the mixing or blending of the turbine outlet air 152 with the compressor outlet air 154 (see FIG. 2) that forms the TC outlet air 155 (see FIG. 2) results in a reduction in the pack inlet air temperature of the inlet air going into the AC pack 42 (see FIG. 2) and generates a reduced temperature pack inlet air 156 (see FIG. 2) that flows into the AC pack 42 (see FIG. 2) from the TC system 10. Because the temperature of the pack inlet air going into the AC pack 42 (see FIG. 2) may have an effect on how much work the AC pack 42 (see FIG. 2) has to do, for example, to cool the air, the reduced temperature pack inlet air 156 (see FIG. 2) has the effect of decreasing the work that the AC pack 42 (see FIG. 2) has to do to cool the pack inlet air coming into the AC pack 42 (see FIG. 2).

The TC system 10 (see FIGS. 2-5) serves to reduce the pack inlet air temperature, thereby reducing pack heat exchanger (HX) 44 (see FIGS. 2-5) ram air flows, which in turn, reduces AC pack 42 (see FIGS. 2-5) ram air usage, resulting in a reduced AC pack ram air usage 157 (see FIG. 8) and reduces ram air drag. Thus, the TC system 10 (see FIGS. 2-5) provides AC pack 42 (see FIGS. 2-5) ram air drag savings and engine fan 74 (see FIGS. 2-5) savings.

Preferably, in one embodiment, when the TC system 10 (see FIGS. 2-3) is in an operating mode, such as when the aircraft 12 is in cruise, is in the climb or descent phases (or a portion of the climb or descent phases), the pack FCV 130 (see FIGS. 2-3) is closed, and the bleed air 50 (see FIGS. 2-3) is diverted and flows through the TC system 10 (see FIGS. 2-3). Thus, all of the reduced temperature pack inlet air 156 (see FIGS. 2-3) that flows into the AC pack 42 (see FIGS. 2-3) comes from the TC system 10 (see FIGS. 2-3). In this embodiment, the reduced temperature pack inlet air 156 (see FIGS. 2-3) comprises the TC outlet air 155 (see FIGS. 2-3) mixture of turbine outlet air 152 (see FIG. 2-3) and compressor outlet air 154 (see FIG. 2-3).

The TCCV 134 (see FIGS. 2-7B) of the TC system 10 (see FIGS. 2-7B) performs the pack flow control function of the pack FCV 130 (see FIGS. 2-7B) when the TCCV 134 (see FIGS. 2-7B) is open and the pack FCV 130 (see FIGS. 2-7B) is closed. The TCCV 134 (see FIGS. 2-7B) modulation provides real time pneumatic power 242 (see FIG. 8) extraction optimization and net bleed air 50 (see FIGS. 2-7B) savings and real time optimized % SFC (specific fuel consumption) savings. Preferably, when the TC system 10 (see FIGS. 2-3) is in an operating mode, it is desirable to also have the pressure regulating shutoff valve (PRSOV) 92 (see FIGS. 2-7B) and the over pressure valve (OPV) 108 (see FIGS. 2-7B) of the bleed air system 34 (see FIGS. 2-7B) both open as much as possible to minimize or prevent the PRSOV 92 and the OPV 108 from modulating and dropping the pressure of the bleed air 50 (see FIGS. 2-7B) so as to maximize the bleed air pressure 234 (see FIG. 8) of the bleed air 50 to the TC system 10 and to minimize any wasted energy.

Figure 4:
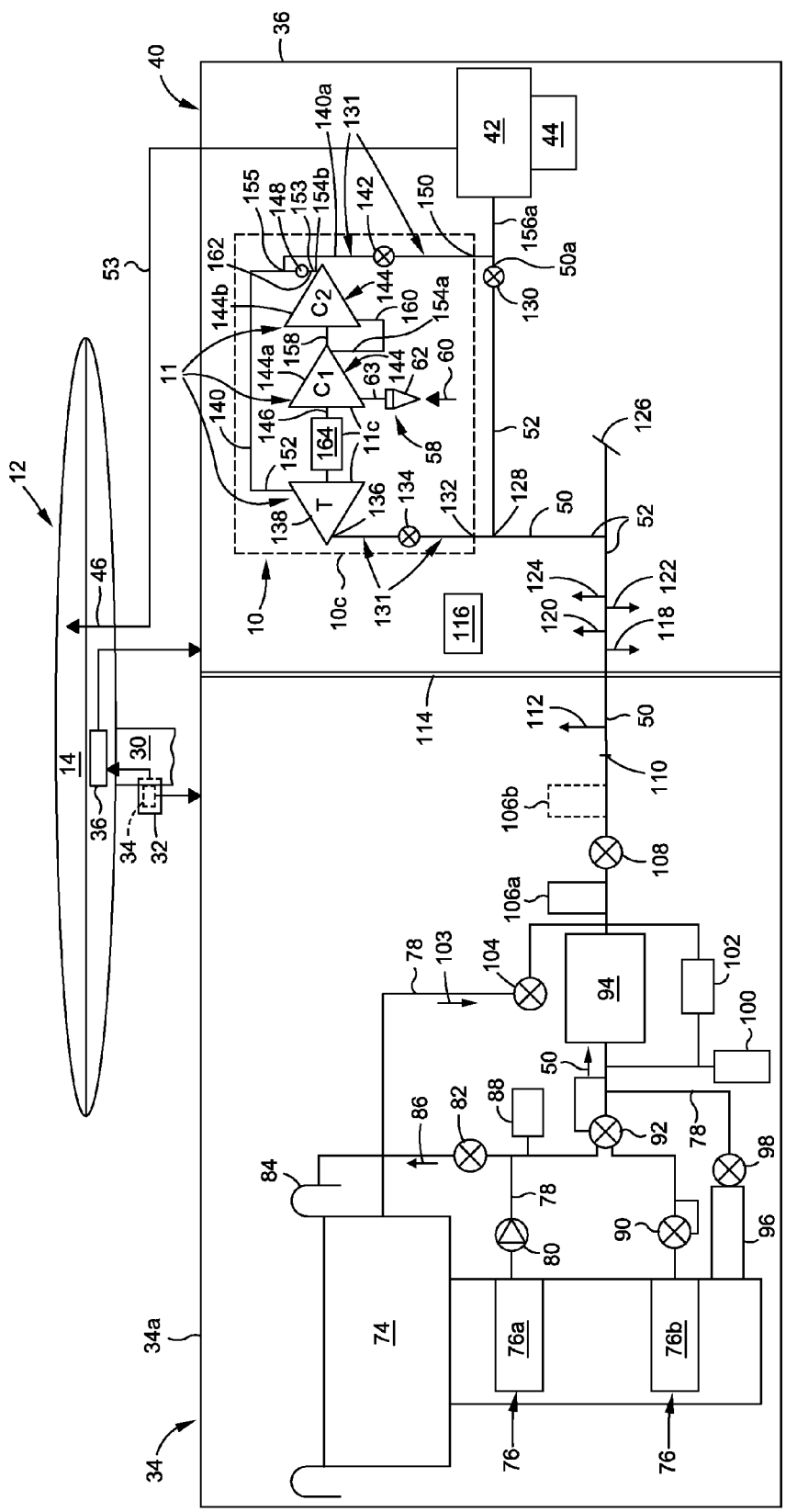
FIG. 4 is an illustration of a schematic diagram of another embodiment of a turbo-compressor (TC) system of the disclosure with a turbine, an electric motor, two compressors and a ram air inlet, where the TC system is shown in an aircraft air conditioning system and coupled to a bleed air system.

In another embodiment, as shown in FIG. 4, when the TC system 10 is in operating mode, such as when the aircraft 12 is in cruise, climb or descent, the pack FCV 130 is open and bleed air 50 flows through both the TC system 10 and the pack FCV 130. As shown in FIG. 4, bleed air 50a flowing through the pack FCV 130 is mixed with the TC outlet air 155 coming from the TC system 10 and the mixture forms reduced temperature pack inlet air 156a that flows into the AC pack 42. In this embodiment, the reduced temperature pack inlet air 156a (see FIG. 4) comprises the TC outlet air 155 (see FIG. 4) mixture of turbine outlet air 152 (see FIG. 4) and compressor outlet air 154 (see FIG. 4) and the bleed air 50a (see FIG. 4) flowing through the pack FCV 130 (see FIG. 4). Alternatively, the TC system 10 shown in FIG. 4 may use the reduced temperature pack inlet air 156 comprised of the TC outlet air 155 only, as shown in FIGS. 2-3.

Figure 5:
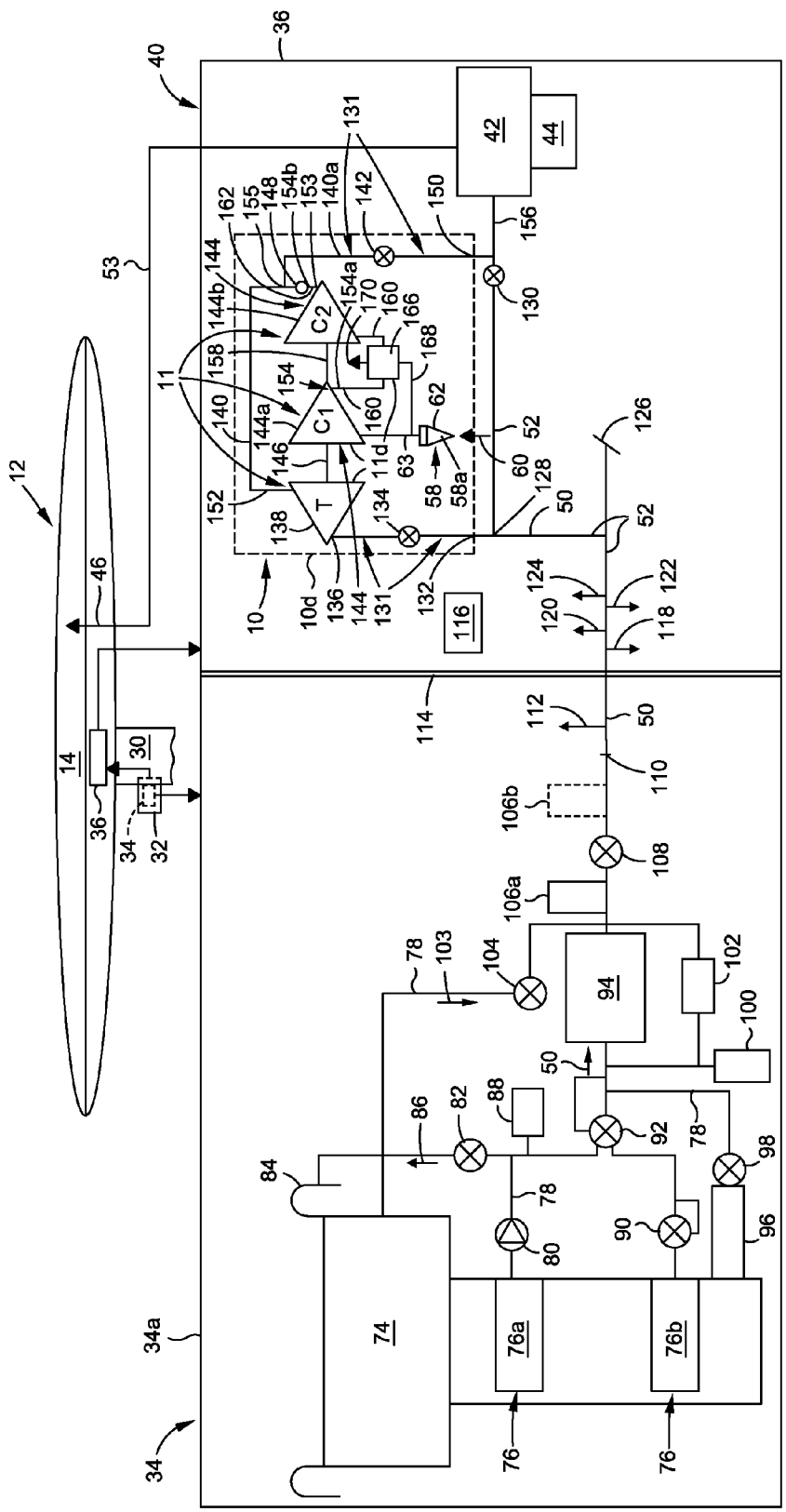
FIG. 5 is an illustration of a schematic diagram of another embodiment of a turbo-compressor (TC) system of the disclosure with a turbine, an intercooler heat exchanger, two compressors and a ram air inlet, where the TC system is shown in an aircraft air conditioning system and coupled to a bleed air system.

Further, although embodiments of the TC system 10 shown in FIGS. 2-3 and 5 show the reduced temperature pack inlet air 156 comprised of the TC outlet air 155 only, such embodiments of the TC system 10 shown in FIGS. 2-3 and 5 may also use the reduced temperature pack inlet air 156a (see FIG. 4) comprising the TC outlet air 155 (see FIG. 4) mixture of turbine outlet air 152 (see FIG. 4) and compressor outlet air 154 (see FIG. 4) and the bleed air 50a (see FIG. 4) flowing through the pack FCV 130 (see FIG. 4).

FIG. 3 is an illustration of a schematic diagram of another embodiment of a turbo-compressor (TC) system 10, such as in the form of TC system 10b, having an embodiment of a TC assembly 11, such as in the form of TC assembly 11b. The TC system 10, such as in the form of TC system 10b, is similar to the TC system 10a of FIG. 2, except that instead of one compressor 144, the TC assembly 11, such as in the form of TC assembly 11b, has two compressors 144. In this embodiment, as shown in FIG. 3, the TC assembly 11, such as in the form of TC assembly 11b, comprises a turbine 138 mechanically coupled to two compressors 144, such as in the form of first compressor (C1) 144a and second compressor (C2) 144b. As further shown in FIG. 3, the turbine 138 is mechanically coupled to the first compressor (C1) 144a via shaft 146, and the first compressor (C1) 144a is mechanically coupled to the second compressor (C2) 144b via shaft 158. A compressor duct 160 (see FIG. 3) may be coupled between the first compressor (C1) 144a (see FIG. 3) and the second compressor (C2) 144b (see FIG. 3). This embodiment may have the advantage of a reduced overall height of the TC assembly 11b and the TC system 10b, thus allowing the TC assembly 11b and the TC system 10b to more easily fit within a designated installation space or area within the aircraft 12 (see FIG. 1A).

As shown in FIG. 3, the turbine 138 has a turbine inlet 136 for receiving the bleed air 50 transported through the plurality of connective ducts 131 in the TC system 10b and bleed air ducts 52 from the bleed air system 34. The turbine 138 (see FIG. 3) expands the bleed air 50 (see FIG. 3) through the turbine 138 (see FIG. 3) and extracts extracted energy 238 (see FIG. 8) from the bleed air 50 (see FIG. 3) passing through the turbine 138 (see FIG. 3) to generate power 240 (see FIG. 8), such as pneumatic power 242 (see FIG. 8), to drive the first compressor (C1) 144a. As shown by FIG. 3, the turbine 138 generates turbine outlet air 152 which flows out of the turbine 138 via outlet duct 140 (see FIG. 3).

As shown in FIG. 3, the first compressor (C1) 144a may intake ram air 60 via the ram air inlet 58 coupled to the first compressor (C1) 144a. FIG. 3 shows the embodiment of the ram air inlet 58 in the form of ram air inlet scoop 62 with ram air inlet scoop duct 63, as discussed above and also shown in FIG. 1A. However, the ram air inlet 58 in the form of ram air inlet bypass duct 68 (see FIG. 1B), as discussed above and shown in FIG. 1B, may also be used with this embodiment of the TC assembly 11, such as in the form of TC assembly 11b.

As shown in FIG. 3, the first compressor (C1) 144a compresses the ram air 60 and generates compressor outlet air 154 (see FIG. 3), such as first compressor outlet air 154a (see FIG. 3) that may be transported to the second compressor (C2) 144b via compressor duct 160. As further shown in FIG. 3, the second compressor (C2) 144b compresses the first compressor outlet air 154a (i.e., compressed ram air 60) and generates second compressor outlet air 154b (see FIG. 3). As shown in FIG. 3, temperature sensor 148 may be positioned at or near the compressor outlet 162 of the second compressor (C2) 144b and may preferably provide overheat protection of the second compressor outlet air 154b.

The turbine outlet air 152 (see FIG. 3) is mixed or blended with the second compressor outlet air 154b (see FIG. 3) to form turbo-compressor (TC) outlet air 155 (see FIG. 3). The TC outlet air 155 (see FIG. 3) may be transported via the plurality of connective ducts 131 (see FIG. 3), such as in the form of outlet duct 140a (see FIG. 3), and through the TC outlet 150 (see FIG. 3). The mixing or blending of the turbine outlet air 152 (see FIG. 3) with the second compressor outlet air 154b (see FIG. 3) that forms the TC outlet air 155 (see FIG. 3) results in a reduction in the pack inlet air temperature of the inlet air going into the AC pack 42 (see FIG. 3) and generates a reduced temperature pack inlet air 156 (see FIG. 3) that flows into the AC pack 42 (see FIG. 3) from the TC system 10b (see FIG. 3).

FIG. 4 is an illustration of a schematic diagram of another embodiment of a turbo-compressor (TC) system 10, such as in the form of TC system 10c, having an embodiment of a TC assembly 11, such as in the form of TC assembly 11c. The TC system 10, such as in the form of TC system 10c, is similar to the TC system 10b of FIG. 3, except that an electric motor 164 is mechanically coupled between the turbine 138 and the at least one compressor 144, such as in the form of first compressor (C1) 144a.

In this embodiment, as shown in FIG. 4, the TC assembly 11, such as in the form of TC assembly 11c, comprises a turbine 138 mechanically coupled to the first compressor (C1) 144a via shaft 146, and having the electric motor 164 coupled to the shaft 146 between the turbine 138 and the first compressor (C1) 144a. The electric motor 164 (see FIG. 4) preferably augments power to the first compressor (C1) 144a (see FIG. 4). This embodiment of the TC system 10c (see FIG. 4) is preferably a hybrid electric system, that is, the TC system 10c still uses bleed air 50 (see FIG. 4), but the bleed air 50 is augmented with some electric power from the electric motor 164 (see FIG. 4) in order to further enhance the fuel consumption savings. This embodiment may be beneficial if there are conditions where the bleed air pressure 234 (see FIG. 8) is inadequate to support the needs of the aircraft air conditioning system 40 (see FIG. 8) and augmentation is needed.

As further shown in FIG. 4, the first compressor (C1) 144a is mechanically coupled to the second compressor (C2) 144b via shaft 158. A compressor duct 160 (see FIG. 4) may be coupled between the first compressor (C1) 144a (see FIG. 4) and the second compressor (C2) 144b (see FIG. 4).

As further shown in FIG. 4, the turbine 138 has a turbine inlet 136 for receiving the bleed air 50 transported through the plurality of connective ducts 131 in the TC system 10c and bleed air ducts 52 from the bleed air system 34. The turbine 138 (see FIG. 4) expands the bleed air 50 (see FIG. 4) through the turbine 138 (see FIG. 4) and extracts extracted energy 238 (see FIG. 8) from the bleed air 50 (see FIG. 4) passing through the turbine 138 (see FIG. 4) to generate power 240 (see FIG. 8), such as pneumatic power 242 (see FIG. 8). The electric motor 164 (see FIG. 4) generates power or energy and is used to augment the pneumatic power 242 (see FIG. 8) derived by the turbine 138 (see FIG. 4) to then drive a compressor 144 (see FIG. 4), such as a first compressor (C1) 144a (see FIG. 4). As shown by FIG. 4, the turbine 138 generates turbine outlet air 152 which flows out of the turbine 138 via outlet duct 140 (see FIG. 4).

As further shown in FIG. 4, the first compressor (C1) 144a may intake ram air 60 via the ram air inlet 58 coupled to the first compressor (C1) 144a. FIG. 4 shows the embodiment of the ram air inlet 58 in the form of ram air inlet scoop 62 with ram air inlet scoop duct 63, as discussed above and also shown in FIG. 1A. However, the ram air inlet 58 in the form of ram air inlet bypass duct 68 (see FIG. 1B), as discussed above and shown in FIG. 1B, may also be used with this embodiment of the TC assembly 11, such as in the form of TC assembly 11b.

As further shown in FIG. 4, the first compressor (C1) 144a compresses the ram air 60 and generates compressor outlet air 154, such as first compressor outlet air 154a, that may be transported to the second compressor (C2) 144b via compressor duct 160. As further shown in FIG. 4, the second compressor (C2) 144b compresses the first compressor outlet air 154a (i.e., compressed ram air 60) and generates second compressor outlet air 154b (see FIG. 4). As shown in FIG. 4, temperature sensor 148 may be positioned at or near the compressor outlet 162 of the second compressor (C2) 144b and may preferably provide overheat protection of the second compressor outlet air 154b.

The turbine outlet air 152 (see FIG. 4) is mixed or blended with the second compressor outlet air 154b (see FIG. 4) to form turbo-compressor (TC) outlet air 155 (see FIG. 4). The TC outlet air 155 (see FIG. 4) may be transported via the plurality of connective ducts 131 (see FIG. 4), such as in the form of outlet duct 140a (see FIG. 4), and through the TC outlet 150 (see FIG. 4).

In this embodiment, as discussed above, when the TC system 10c (see FIG. 4) is in operating mode, such as when the aircraft 12 (see FIG. 4) is in cruise, climb or descent, the pack FCV 130 (see FIG. 4) is open and bleed air 50 (see FIG. 4) flows through both the TC system 10c (see FIG. 4) and the pack FCV 130 (see FIG. 4). As shown in FIG. 4, bleed air 50a flowing through the pack FCV 130 is mixed with the TC outlet air 155 from the TC system 10c and the mixture forms reduced temperature pack inlet air 156a that flows into the AC pack 42. In this embodiment, the reduced temperature pack inlet air 156a (see FIG. 4) comprises the TC outlet air 155 (see FIG. 4) mixture of turbine outlet air 152 (see FIG. 4) and compressor outlet air 154 (see FIG. 4) and the bleed air 50a (see FIG. 4) flowing through the pack FCV 130 (see FIG. 4). Alternatively, the TC system 10c shown in FIG. 4 may use reduced temperature pack inlet air 156 comprised of the TC outlet air 155 only, as shown in FIGS. 2-3.

FIG. 5 is an illustration of a schematic diagram of another embodiment of a turbo-compressor (TC) system 10, such as in the form of TC system 10d, having an embodiment of a TC assembly 11, such as in the form of TC assembly 11d. The TC system 10, such as in the form of TC system 10d, is similar to the TC system 10b of FIG. 3, except that an intercooler heat exchanger 166 is coupled between the first compressor (C1) 144a and the second compressor (C2) 144b, and is also coupled to the ram air inlet scoop duct 63.

Depending on the efficiency of the first compressor (C1) 144a and the second compressor (C2) 144b in the TC system 10, an intercooler heat exchanger 166 may be added to preferably maintain a ram air temperature 61 (see FIG. 8) of the ram air 60 (see FIGS. 5, 8) below a fuel auto-ignition temperature limit, assuming the TC system 10d is installed in a flammable fluid leakage zone in the aircraft 12 (see FIG. 5). As shown in FIG. 5, the ram air 60 flowing through the ram air inlet scoop 62 to the ram air inlet scoop duct 63 may be transported via duct 168 to the intercooler heat exchanger 166 for cooling. As further shown in FIG. 5, the first compressor outlet air 154a may be transported via compressor duct 160 to the intercooler heat exchanger 166 for cooling. As shown in FIG. 5, the intercooler heat exchanger 166 may discharge heat 170 from the ram air 60 or the first compressor outlet air 154a cooled through the intercooler heat exchanger 166.

In the embodiment shown in FIG. 5, as an alternative to the addition of the intercooler heat exchanger 166, the second compressor (C2) 144b and the compressor outlet 162 may instead be ventilated at desired locations prior to mixing with the turbine outlet air 152. Such ventilation may be added in the form of one or more ventilation devices 153 (see FIGS. 2-6) known in the art to preferably maintain the air temperature of the first compressor outlet air 154a (see FIGS. 2, 7A, 7B), the second compressor outlet air 154b (see FIGS. 3-5), and the second compressor outlet air 176b (see FIG. 6) below a fuel auto-ignition temperature limit. The one or more ventilation devices 153 (see FIGS. 2-6) may be in the form of ducts or other suitable ventilation devices designed to ventilate the surrounding air.

In this embodiment, as shown in FIG. 5, the TC assembly 11, such as in the form of TC assembly 11d, comprises a turbine 138 mechanically coupled to the first compressor (C1) 144a via shaft 146, and the first compressor (C1) 144a is mechanically coupled to the second compressor (C2) 144b via shaft 158. A compressor duct 160 (see FIG. 3) may be coupled between the first compressor (C1) 144a (see FIG. 3) and the second compressor (C2) 144b (see FIG. 3).

As shown in FIG. 5, the turbine 138 has a turbine inlet 136 for receiving the bleed air 50 transported through the plurality of connective ducts 131 in the TC system 10d and bleed air ducts 52 from the bleed air system 34. The turbine 138 (see FIG. 5) expands the bleed air 50 (see FIG. 5) through the turbine 138 (see FIG. 3) and extracts extracted energy 238 (see FIG. 8) from the bleed air 50 (see FIG. 5) passing through the turbine 138 (see FIG. 5) to generate power 240 (see FIG. 8), such as pneumatic power 242 (see FIG. 8), to drive the first compressor (C1) 144a. As shown by FIG. 5, the turbine 138 generates turbine outlet air 152 which flows out of the turbine 138 via outlet duct 140 (see FIG. 5).

As further shown in FIG. 5, the first compressor (C1) 144a may intake ram air 60 via the ram air inlet 58 coupled to the first compressor (C1) 144a. As discussed above, the ram air 60 (see FIG. 5) may be transported to the intercooler heat exchanger 166 (see FIG. 5) via duct 168 (see FIG. 5). FIG. 5 shows the embodiment of the ram air inlet 58 in the form of ram air inlet scoop 62 with ram air inlet scoop duct 63, as discussed above and also shown in FIG. 1A. However, the ram air inlet 58 in the form of ram air inlet bypass duct 68 (see FIG. 1B), as discussed above and shown in FIG. 1B, may also be used with this embodiment of the TC assembly 11, such as in the form of TC assembly 11b.

As further shown in FIG. 5, the first compressor (C1) 144a compresses the ram air 60 and generates compressor outlet air 154 (see FIG. 3), such as first compressor outlet air 154a (see FIG. 3) that may be transported via compressor duct 160 to the intercooler heat exchanger 166 and then via compressor duct 160 to the second compressor (C2) 144b. As further shown in FIG. 5, the second compressor (C2) 144b compresses the first compressor outlet air 154a (i.e., compressed ram air 60) or the ram air 60 that has been cooled by the intercooler heat exchanger 166 and generates second compressor outlet air 154b (see FIG. 5). As shown in FIG. 5, temperature sensor 148 may be positioned at or near the compressor outlet 162 of the second compressor (C2) 144b and may preferably provide overheat protection of the second compressor outlet air 154b.

The turbine outlet air 152 (see FIG. 5) is mixed or blended with the second compressor outlet air 154b (see FIG. 5) to form turbo-compressor (TC) outlet air 155 (see FIG. 5). The TC outlet air 155 (see FIG. 5) may be transported via the plurality of connective ducts 131 (see FIG. 5), such as in the form of outlet duct 140a (see FIG. 5), and through the TC outlet 150 (see FIG. 5). The mixing or blending of the turbine outlet air 152 (see FIG. 5) with the second compressor outlet air 154b (see FIG. 5) that forms the TC outlet air 155 (see FIG. 5) results in a reduction in the pack inlet air temperature of the inlet air going into the AC pack 42 (see FIG. 5) and generates a reduced temperature pack inlet air 156 (see FIG. 5) that flows into the AC pack 42 (see FIG. 5) from the TC system 10d (see FIG. 5).

Figure 6:
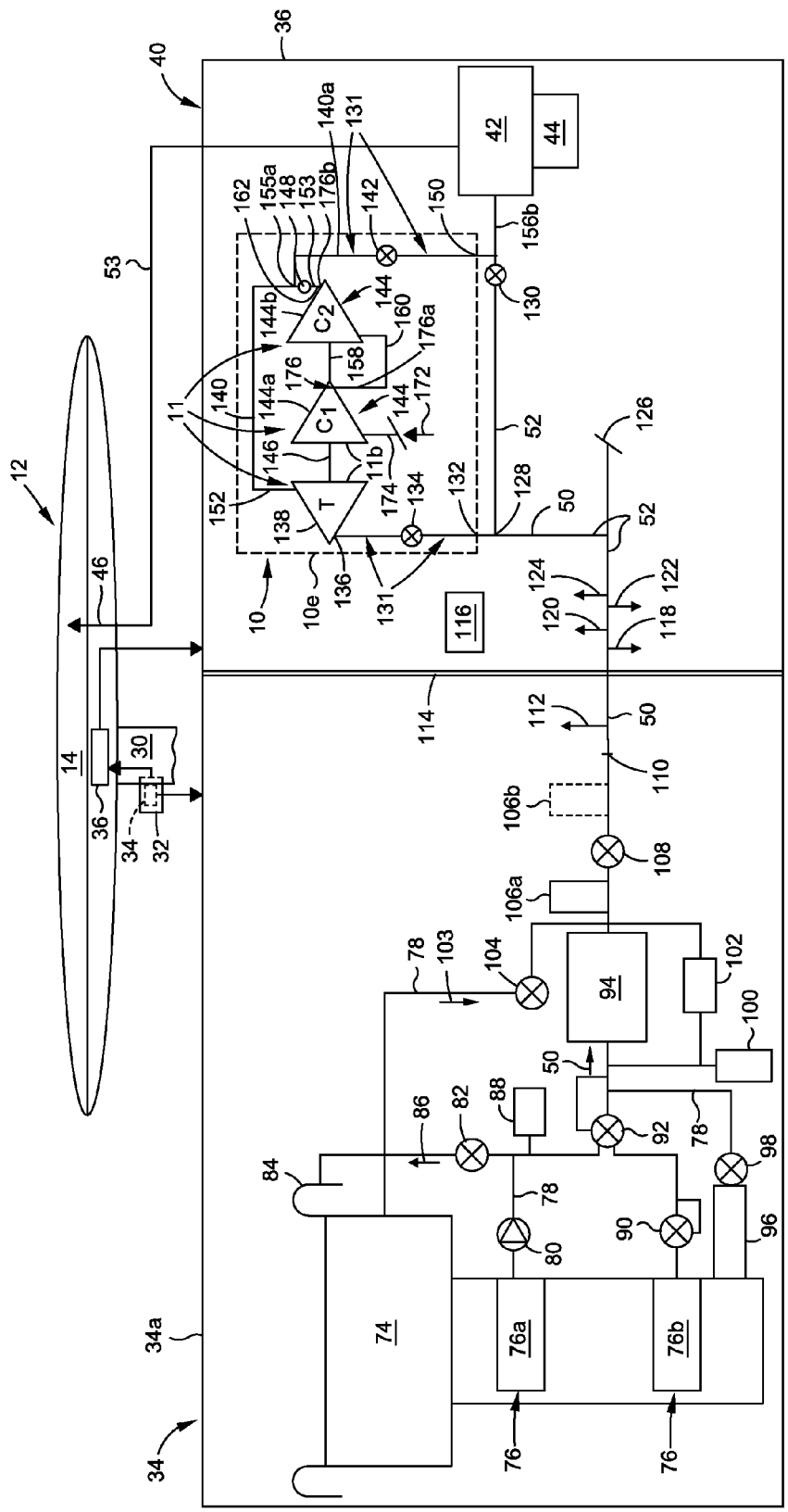
FIG. 6 is an illustration of a schematic diagram of another embodiment of a turbo-compressor (TC) system of the disclosure with a turbine, two compressors and a recirculated cabin air duct instead of a ram air inlet, where the TC system is shown in an aircraft air conditioning system and coupled to a bleed air system.

FIG. 6 is an illustration of a schematic diagram of another embodiment of a turbo-compressor (TC) system 10, such as in the form of TC system 10e, having an embodiment of a TC assembly 11, such as in the form of TC assembly 11e. The TC system 10, such as in the form of TC system 10e, is similar to the TC system 10b of FIG. 3, except that instead of ram air 60 (see FIG. 3) and a ram air inlet scoop 62 and ram air inlet scoop duct 63, recirculated cabin air 172 and a recirculated cabin air duct 174 are used and coupled to the first compressor (C1) 144a.

In this embodiment, as shown in FIG. 6, the TC assembly 11, such as in the form of TC assembly 11e, comprises a turbine 138 mechanically coupled to two compressors 144, such as in the form of first compressor (C1) 144a and second compressor (C2) 144b. As shown in FIG. 6, the turbine 138 is mechanically coupled to the first compressor (C1) 144a via shaft 146, and the first compressor (C1) 144a is mechanically coupled to the second compressor (C2) 144b via shaft 158. A compressor duct 160 (see FIG. 6) may be coupled between the first compressor (C1) 144a (see FIG. 6) and the second compressor (C2) 144b (see FIG. 6).

In this embodiment, as shown in FIG. 5, the ram air inlet 58 (see FIG. 3) configured for intake of ram air 60 (see FIG. 3) by the at least one compressor 144 is substituted with a recirculated cabin air duct 174 coupled to the at least one compressor (C1) 144a and configured for intake of recirculated cabin air 172 from the aircraft cabin 14 by the first compressor (C1) 144a. Thus, instead of ram air 60 (see FIGS. 3-5) intake by the first compressor (C1) 144a, recirculated cabin air 172 is drawn in by the first compressor (C1) 144a. A recirculated cabin air duct 174 is used instead of the ram air inlet 58 (see FIGS. 3-5).

As shown in FIG. 6, the turbine 138 has a turbine inlet 136 for receiving the bleed air 50 transported through the plurality of connective ducts 131 in the TC system 10e and bleed air ducts 52 from the bleed air system 34. The turbine 138 (see FIG. 6) expands the bleed air 50 (see FIG. 6) through the turbine 138 (see FIG. 6) and extracts extracted energy 238 (see FIG. 8) from the bleed air 50 (see FIG. 6) passing through the turbine 138 (see FIG. 6) to generate power 240 (see FIG. 8), such as pneumatic power 242 (see FIG. 8), to drive the first compressor (C1) 144a. As shown by FIG. 6, the turbine 138 generates turbine outlet air 152 which flows out of the turbine 138 via outlet duct 140 (see FIG. 6).

As further shown in FIG. 6, the first compressor (C1) 144a may intake the recirculated cabin air 172 via the recirculated cabin air duct 174 coupled to the first compressor (C1) 144a. As further shown in FIG. 6, the first compressor (C1) 144a compresses the recirculated cabin air 172 and generates compressor outlet air 176 (see FIG. 6), such as first compressor outlet air 176a (see FIG. 6) that may be transported via compressor duct 160 to the second compressor (C2) 144b. As further shown in FIG. 6, the second compressor (C2) 144b compresses the first compressor outlet air 176a (i.e., compressed recirculated cabin air 172) and generates second compressor outlet air 176b (see FIG. 6). As shown in FIG. 6, temperature sensor 148 may be positioned at or near the compressor outlet 162 of the second compressor (C2) 144b and may preferably provide overheat protection of the second compressor outlet air 176b.

As further shown in FIG. 6, as an alternative to or in addition to the temperature sensor 148, ventilation may be added in the form of one or more ventilation devices 153 known in the art to preferably maintain the air temperature of the second compressor outlet air 176b below a fuel auto-ignition temperature limit. The one or more ventilation devices 153 (see FIG. 6) may be in the form of ducts or other suitable ventilation devices designed to ventilate the surrounding air.

The turbine outlet air 152 (see FIG. 6) is mixed or blended with the second compressor outlet air 176b (see FIG. 6) to form turbo-compressor (TC) outlet air 155a (see FIG. 6). The TC outlet air 155a (see FIG. 6) may be transported via the plurality of connective ducts 131 (see FIG. 6), such as in the form of outlet duct 140a (see FIG. 6), and through the TC outlet 150 (see FIG. 6). The mixing or blending of the turbine outlet air 152 (see FIG. 6) with the second compressor outlet air 176b (see FIG. 6) that forms the TC outlet air 155a (see FIG. 6) results in a reduction in the pack inlet air temperature of the inlet air going into the AC pack 42 (see FIG. 6) and generates a reduced temperature pack inlet air 156b (see FIG. 6) that flows into the AC pack 42 (see FIG. 6) from the TC system 10e (see FIG. 6).

Although the embodiment of the TC system 10e shown in FIG. 6 shows the reduced temperature pack inlet air 156a comprised of the TC outlet air 155a only, such embodiment of the TC system 10e shown in FIG. 6 may also use the reduced temperature pack inlet air 156a (see FIG. 4) comprising the TC outlet air 155 (see FIG. 4) mixture of turbine outlet air 152 (see FIG. 4) and compressor outlet air 154 (see FIG. 4) and the bleed air 50a (see FIG. 4) flowing through the pack FCV 130 (see FIG. 4).

Figure 7A:
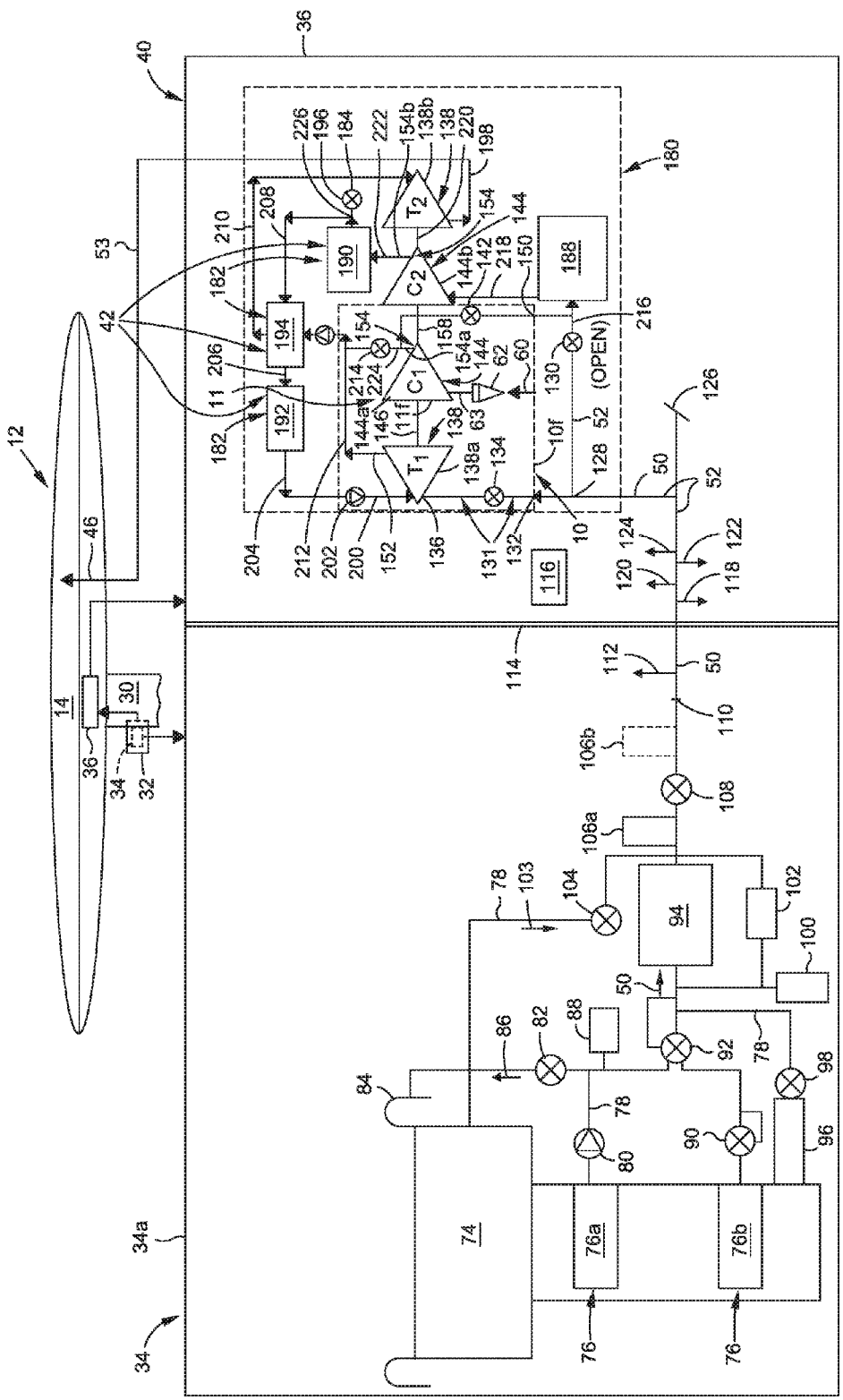
FIG. 7A is an illustration of a schematic diagram of another embodiment of a turbo-compressor (TC) system of the disclosure in the form of an integrated turbo-compressor air cycle machine (ACM) system and a ram air inlet, where the TC system is shown in an aircraft air conditioning system and coupled to a bleed air system and a pack flow control valve (FCV) is in an open position.
Figure 7B:
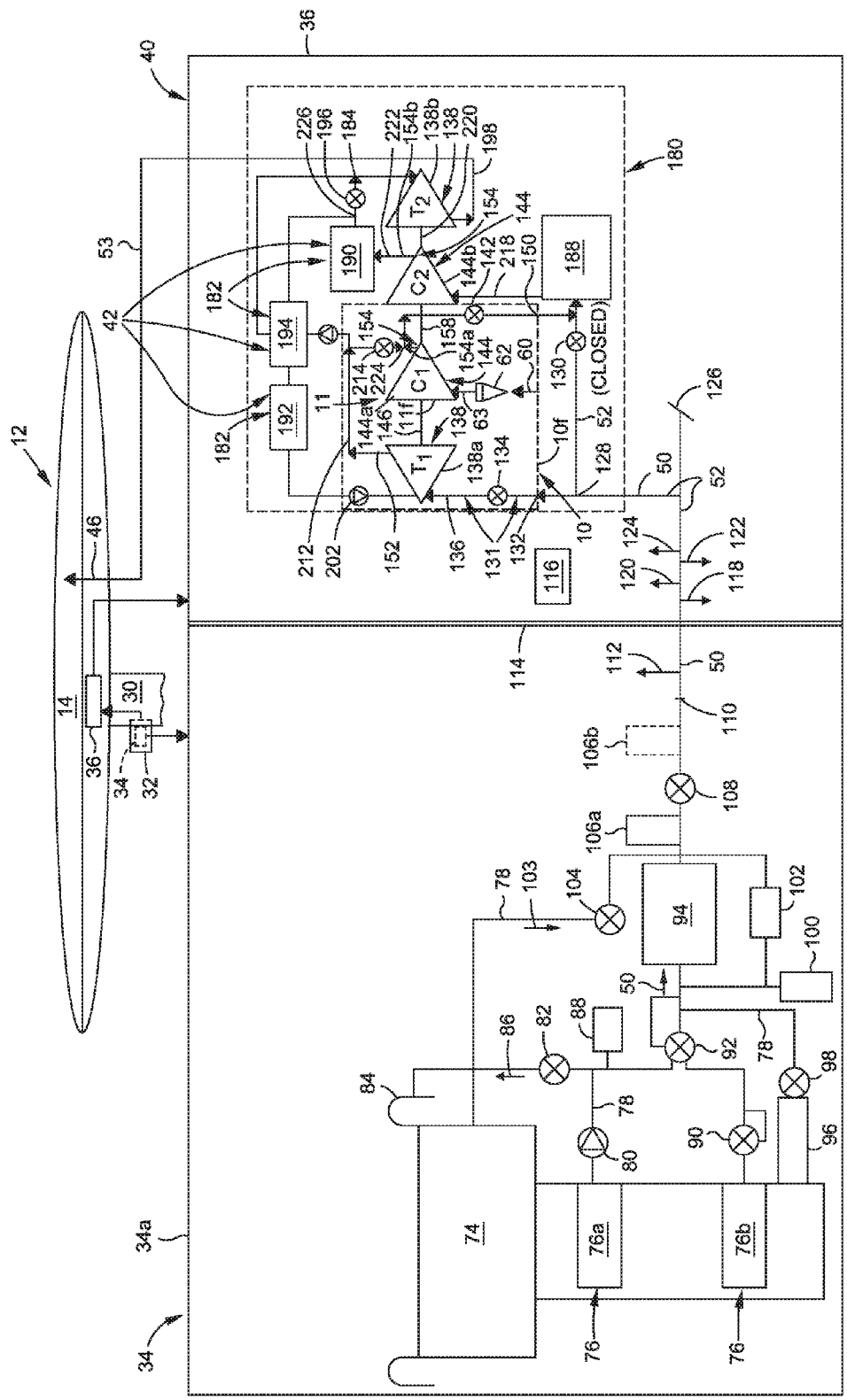
FIG. 7B is an illustration of a schematic diagram of the turbo-compressor (TC) system of FIG. 7A, where the TC system is shown in an aircraft air conditioning system and coupled to a bleed air system and the pack flow control valve (FCV) is in a closed position.

FIGS. 7A-7B are illustrations of a schematic diagram of another embodiment of a turbo-compressor (TC) system 10, such as in the form of TC system 10f, having an embodiment of a TC assembly 11, such as in the form of TC assembly 11f. FIG. 7A shows the pack flow control valve (FCV) 130 in an open position. This mode of operation with the pack flow control valve (FCV) 130 (see FIG. 7A) in an open position is not intended to provide a fuel savings benefit. FIG. 7B shows the pack flow control valve (FCV) 130 in a closed position. This mode of operation with the pack flow control valve (FCV) 130 (see FIG. 7B) in a closed position provides a fuel savings benefit.

Figure 8:
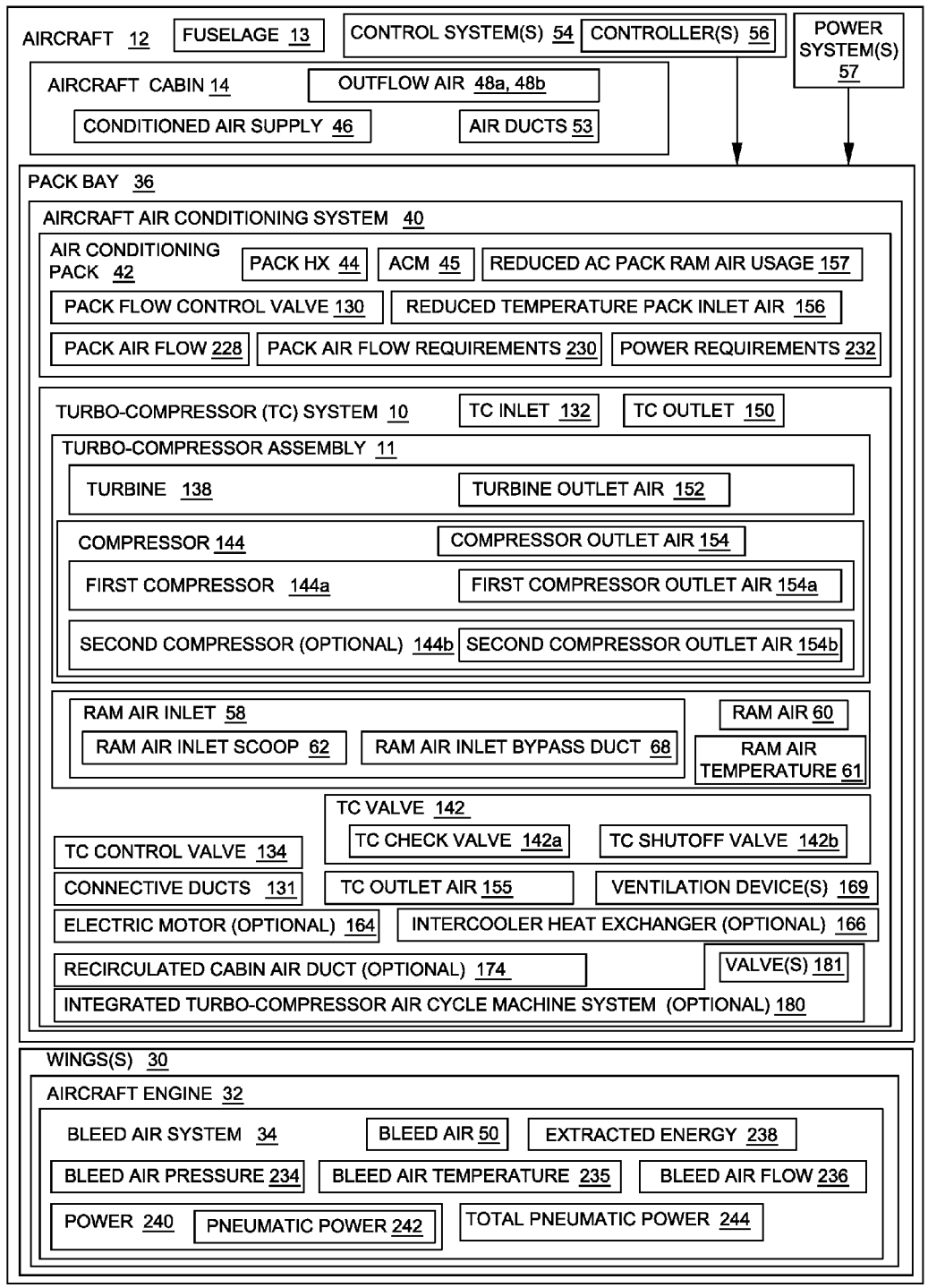
FIG. 8 is an illustration of a block diagram of an aircraft showing an aircraft air conditioning system with embodiments of a turbo-compressor system of the disclosure.

In this embodiment, as shown in FIGS. 7A-7B, the TC system 10, such as in the form of TC system 10f, comprises the turbo-compressor (TC) system 10 integrated with an air cycle system 182 of the aircraft air conditioning system 40 to form an integrated turbo-compressor air cycle machine (ACM) system 180, and includes one or more additional valves 181 (see FIG. 8), such as turbo-compressor valves 142 (see FIG. 8). For example, the integrated turbo-compressor air cycle machine system 180 may comprise an additional turbo-compressor check valve 202 (see FIGS. 7A-7B), may comprise an additional turbo-compressor control valve (TCCV) 214 (see FIGS. 7A-7B), or may comprise other additional valves.

As further shown in FIGS. 7A-7B, the turbo-compressor (TC) system 10, such as in the form of TC system 10f, is in an aircraft air conditioning system 40 and is coupled to a bleed air system 34. For the embodiment shown in FIGS. 7A-7B, the AC pack 42 (see FIGS. 2-6) may be in the form of an air cycle system 182. As shown in FIGS. 7A-7B, the air cycle system 182 may comprise a primary heat exchanger 188, a secondary heat exchanger 190, a water collector 192, a condenser heat exchanger 194, a water collector/condenser bypass valve 196, and various connective ducts. The air cycle system 182 of the integrated turbo-compressor air cycle machine system 180 shown in FIGS. 7A-7B is an exemplary embodiment of the ACM system structure that may be used with the TC system 10f (see FIGS. 7A-7B) disclosed herein, and is not meant to be limiting and should not be construed as limited to this embodiment. Rather, other suitable ACM system structures known in the art may be used with the TC system 10f disclosed herein.

In this embodiment, as shown in FIGS. 7A-7B, the TC system 10, such as in the form of TC system 10f, comprises a turbine 138, such as a first turbine (T1) 138a, mechanically coupled to a compressor 144, such as a first compressor (C1) 144a, via a shaft 146. As further shown in FIGS. 7A-7B, the first compressor (C1) 144a is mechanically coupled to another compressor 144, such as a second compressor (C2) 144b, via a shaft 158, and the second compressor (C2) 144b is mechanically coupled to another turbine 138, such as a second turbine (T2) 138b, via a shaft 220. The first turbine (T1) 138a (see FIGS. 7A-7B), the second turbine (T2) 138b (see FIGS. 7A-7B), and the second compressor (C2) 144b (see FIGS. 7A-7B) may be components of an existing turbo-compressor system of the aircraft air conditioning system 40, and the first compressor (C1) 144a (see FIGS. 7A-7B) is preferably added as a new component part of the TC system 10 (see FIGS. 7A-7B), such as in the form of TC system 10f (see FIGS. 7A-7B).

FIG. 7A shows the pack flow control valve (FCV) 130 in an open position, and the bleed air 50 flows through the pack FCV 130 as reduced temperature inlet air 216 to the primary heat exchanger 188, instead of directly to the turbine 138, such as the first turbine (T1) 138a. FIG. 7A shows the bleed air 50 flowing through bypass intersection 128, through the pack FCV 130, through the primary heat exchanger 188, through duct 218 to the compressor 144, such as the second compressor (C2) 144b. The second compressor (C2) 144b (see FIG. 7A) generates or outputs second compressor outlet air 154b (see FIG. 7A) which flows through duct 222 (see FIG. 7A) to the secondary heat exchanger 190 (see FIG. 7A).

Reduced temperature outlet air 226 (see FIG. 7A) flows out of the secondary heat exchanger 190 (see FIG. 7A), through duct 208 (see FIG. 7A) through the condenser heat exchanger 194 (see FIG. 7A), through duct 206 (see FIG. 7A), through the water collector 192 (see FIG. 7A), through duct 204 (see FIG. 7A), through the turbo-compressor check valve 202 (see FIG. 7A), through the turbine inlet 136 and to the turbine 138, such as first turbine (T1) 138a. The first turbine (T1) 138a (see FIG. 7A) generates or outputs turbine outlet air 152 (see FIG. 7A) which flows through duct 212 (see FIG. 7A) back through the condenser heat exchanger 194 (see FIG. 7A), through duct 210 (see FIG. 7A), to the turbine 138 (see FIG. 7A), such as second turbine (T2) 138b (see FIG. 7A).

The second turbine (T2) 138b (see FIG. 7A) generates conditioned turbine outlet air 198 (see FIG. 7A). The conditioned turbine outlet air 198 (see FIG. 7A) is then supplied via ducts 53 (see FIG. 7A) as the conditioned air supply 46 (see FIG. 7) to the aircraft cabin 14 (see FIG. 7A).

FIG. 7B shows the pack flow control valve (FCV) 130 in a closed position, and the bleed air 50 flows to the turbine 138, such as the first turbine (T1) 138a, instead of through the pack FCV 130. FIG. 7B shows the bleed air 50 flowing past bypass intersection 128, through the turbo-compressor inlet 132, through the turbo-compressor control valve (TCCV) 134, through the turbine inlet 136 and into the first turbine (T1) 138a. As shown in FIG. 7B, the bleed air 50 is preferably transported through the plurality of connective ducts 131 in the TC system 10f and through the bleed air ducts 52 from the bleed air system 34.

The turbine 138 (see FIG. 7B), such as first turbine (T1) 138a (see FIG. 7B), expands the bleed air 50 (see FIG. 7B) and extracts extracted energy 238 (see FIG. 8) from the bleed air 50 (see FIG. 7B) passing through the first turbine (T1) 138a (see FIG. 7B) to generate power 240 (see FIG. 8), such as pneumatic power 242 (see FIG. 8), to drive the compressor 144 (see FIG. 7B), such as the first compressor (C1) 144a (see FIG. 7B). As shown in FIG. 7B, the first turbine (T1) 138a generates turbine outlet air 152 which flows out of the first turbine (T1) 138a via turbine outlet duct 212 and through a bypass valve 214.

The compressor 144 (see FIG. 7B), such as the first compressor (C1) 144a (see FIG. 7B), which is driven by the extracted energy 238 (see FIG. 8), may intake or pull in ram air 60 (see FIG. 7B) from outside the aircraft 12 (see FIG. 7B) via the ram air inlet scoop 62 (see FIG. 7B) and the ram air inlet scoop duct 63 (see FIG. 7B) coupled to the first compressor (C1) 144a. The first compressor (C1) 144a compresses the ram air 60. Alternatively, as shown in FIG. 6, the first compressor (C1) 144a may intake recirculated cabin air 172 instead of ram air 60.

As further shown in FIG. 7B, the first compressor (C1) 144a generates or outputs compressor outlet air 154 (i.e., compressed ram air), such as first compressor outlet air 154a, that flows through a compressor outlet duct 224. The compressor outlet air 154 (see FIG. 7B) mixes with the turbine outlet air 152 (see FIG. 7B), and the mixture then flows serially through a turbo-compressor valve 142 (see FIG. 7B), through a turbo-compressor outlet 150 (see FIG. 7B), through the primary heat exchanger 188 (see FIG. 7B), through duct 218, and through a compressor 144, such as a second compressor (C2) 144*b*. The second compressor (C2) 144*b* (see FIG. 7B) compresses and heats the mixture of the compressor outlet air 154 (see FIG. 7B) and the turbine outlet air 152 (see FIG. 7B). The second compressor (C2) 144*b* (see FIG. 7B) generates or outputs compressor outlet air 154 (see FIG. 7B), such as second compressor outlet air 154*b* (FIG. 7B), which flows through duct 222 (see FIG. 7B) through the secondary heat exchanger 190 (see FIG. 7B). Reduced temperature outlet air 226 (see FIG. 7B) is generated from the secondary heat exchanger 190 (see FIG. 7B), passes through a water collector/condenser bypass valve 196 (see FIG. 7B), through duct 184 (see FIG. 7B), to the turbine 138 (see FIG. 7B), such as second turbine (T2) 138*b* (see FIG. 7B). Conditioned turbine outlet air 198 (see FIG. 7B) then flows out of the second turbine (T2) 138*b* and is then supplied via ducts 53 (see FIG. 7B) as the conditioned air supply 46 (see FIG. 7B) to the aircraft cabin 14 (see FIG. 7B).

FIG. 8 is an illustration of a functional block diagram of one of the embodiments of an aircraft 12 showing an aircraft air conditioning system 40 that may include embodiments of the turbo-compressor (TC) system 10 of the disclosure. As shown in FIG. 8, in this embodiment there is provided an aircraft 12 comprising at least one wing 30 and one or more aircraft engines 32 coupled to the at least one wing 30. Each aircraft engine 32 (see FIG. 8) has a bleed air system 34 (see FIG. 8) for generating bleed air 50 (see FIG. 8). The aircraft 12 (see FIG. 8) further comprises a fuselage 13 (see FIG. 8) defining an interior volume 15 (see FIGS. 1A-1B) having an aircraft cabin 14 (see FIG. 8) and a pack bay 36 (see FIG. 8) separate from the aircraft cabin 14 (see FIG. 8). The aircraft 12 (see FIG. 8) further comprises an aircraft air conditioning system 40 (see FIG. 8) positioned in the pack bay 36 (see FIG. 8) and in fluid communication with the aircraft cabin 14 (see FIG. 8).

As further shown in FIG. 8, the aircraft 12 comprises one or more control systems 54 having one or more controllers 56, as discussed in detail above. As further shown in FIG. 8, the aircraft 12 comprises one or more power systems 57 for providing power to the TC system 10 (see FIGS. 2-7B). The aircraft cabin 14 (see FIG. 8) receives a conditioned air supply 46 (see FIG. 8) from the aircraft air conditioning system 40 (see FIG. 8) via air ducts 53 (see FIG. 8). The aircraft 12 (see FIG. 8) further comprises one or more outflow air valves 47*a*, 47*b* (see FIGS. 1A-1B) for allowing outflow air 48*a*, 48*b* (see FIG. 8) to flow out of the aircraft 12 (see FIG. 8). The outflow air 48*a*, 48*b* (see FIG. 8) may comprise cabin outflow air and/or other outflow air from other areas of the aircraft 12 (see FIG. 8).

As further shown in FIG. 8, the aircraft air conditioning system 40 (see FIG. 8) comprises a turbo-compressor (TC) system 10 coupled to an air conditioning (AC) pack 42. The AC pack 42 (see FIG. 8) may comprise a pack heat exchanger 44 (see FIG. 8) and may be in the form of an air cycle system 182 (see FIG. 7A). The AC pack 42 (see FIG. 8) has pack air flow requirements 230 (see FIG. 8) and power requirements 232 (see FIG. 8). A pack flow control valve (FCV) 130 (see FIG. 8) controls pack air flow 228 (see FIG. 8) into the AC pack 42 (see FIG. 8).

As shown in FIG. 8 and discussed in detail above, the TC system 10 comprises the turbo-compressor (TC) assembly 11. The TC system 10 (see FIG. 8) comprises a TC inlet 132 (see FIG. 8) in fluid communication with the bleed air system 34 (see FIG. 8) and configured to intake bleed air 50 (see FIG. 8) from the bleed air system 34 (see FIG. 8) into the TC assembly 11 (see FIG. 8). The TC system 10 (see FIG. 8) further comprises a TC outlet 150 (see FIG. 8) in fluid communication with the AC pack 42 (see FIG. 8) and configured to extract reduced temperature pack inlet air 156 (see FIG. 8) from the TC assembly 10 (see FIG. 8) into the AC pack 42 (see FIG. 8).

As shown in FIG. 8, the TC assembly 11 comprises the turbine 138 mechanically coupled to at least one compressor 144. The turbine 138 (see FIG. 8) discharges turbine outlet air 152 (see FIG. 8). The compressor 144 (see FIG. 8) discharges compressor outlet air 154 (see FIG. 8). The compressor 144 (see FIG. 8) may comprise a first compressor (C1) 144*a* (see FIG. 8) that discharges first compressor outlet air 154*a* (see FIG. 8) and a second compressor (C2) 144*b* (see FIG. 8) that discharges second compressor outlet air 154*b* (see FIG. 8).

As shown in FIG. 8, the TC system 10 further comprises a ram air inlet 58 coupled to the at least one compressor 144 and configured for intake of ram air 60 having a ram air temperature 61 by the at least one compressor 144. The ram air inlet 58 (see FIG. 8) may comprise in one embodiment a ram air inlet scoop 62 (see FIG. 8) and may comprise in another embodiment a ram air inlet bypass duct 68 (see FIG. 8).

As shown in FIG. 8, the TC system 10 further comprises a TC control valve 134 and a TC valve 142, both coupled to the TC assembly 11 via a plurality of connective ducts 131. The TC valve 142 (see FIG. 8) may comprise a TC check valve 142*a* (see FIG. 8), a TC shutoff valve 142*b* (see FIG. 8), or another suitable TC valve. The turbine outlet air 152 (see FIG. 8) mixes with the compressor outlet air 154 (see FIG. 8) to form TC outlet air 155 (see FIG. 8). The TC system 10 may further comprise one or more temperature sensors (see FIG. 2) positioned at a compressor outlet 162 (see FIG. 2) of the at least one compressor 144 (see FIG. 2).

In various embodiments of the TC system 10, as shown in FIG. 8 and discussed in detail above, the TC assembly 11 of the TC system 10 may optionally comprise an electric motor 164 (see FIG. 4) mechanically coupled between the turbine 138 and the at least one compressor 144; an intercooler heat exchanger 166 (see FIG. 5) coupled to the at least one compressor 144; a recirculated cabin air duct 174 (see FIG. 6) in place of the ram air inlet 58 (see FIG. 8) and coupled to the at least one compressor 144 and configured for intake of recirculated cabin air 172 from the aircraft cabin 14 by the at least one compressor 144; or an integrated turbo-compressor air cycle machine system 180 (see FIG. 7A) including one or more additional valves 181.

The turbine 138 (see FIG. 8) of the TC system 10 (see FIG. 8) extracts extracted energy 238 (see FIG. 8) from the bleed air 50 (see FIG. 8). This generates power 240 (see FIG. 8), such as pneumatic power 242 (see FIG. 8), to reduce bleed air flow 236 (see FIG. 8) and bleed air pressure 234 (see FIG. 8) needed for the AC pack 42 (see FIG. 8), resulting in reduced power requirements 232 (see FIG. 8), such as a reduced total pneumatic power 244 (see FIG. 8) required for the air conditioning system 40 (see FIG. 8) and reduced air conditioning pack ram air usage 157 (see FIG. 8).

For any given operating condition, there is a minimum pressure needed at the air conditioning pack inlet 43 (see FIG. 2) to provide the cooling and air flow required for the aircraft 12 (see FIG. 1A). Under certain circumstances, the pressure provided by the bleed air system 34 (see FIG. 2) may be above this minimum pressure needed at the air conditioning pack inlet 43 (see FIG. 2). The turbo-compressor (TC) system 10 (see FIGS. 2-8) preferably uses this excess pressure to compress ram air 60 (see FIGS. 2, 8), or outside air, and augment the bleed air 50 (see FIGS. 2-8)

flowing to the turbo-compressor (TC) system 10 (see FIG. 2-8). Alternatively, in an embodiment shown in FIG. 6, recirculated cabin air 172 may be used instead of ram air 60 (see FIG. 2). The reduction in bleed air 50 (see FIGS. 2-8) flowing from the bleed air system 34 (see FIGS. 2-8) preferably reduces the overall extracted energy 238 (see FIG. 8) or power extracted from the aircraft engine 32 (see FIGS. 2-7B). The turbo-compressor system 10 (see FIGS. 2-8) is preferably controlled to provide the pressure and flow needed by the air conditioning pack 42 (see FIG. 2). In doing so, air flow temperatures at the air conditioning pack inlet 43 (see FIG. 2) are reduced, and this results in reduced temperature pack inlet air 156 (see FIGS. 2, 8). The net effect is reduced power requirements 232 (see FIG. 8) for the aircraft air conditioning system 40 (see FIGS. 2, 8) and reduced air conditioning pack ram air usage 157 (see FIG. 8).

Figure 9:
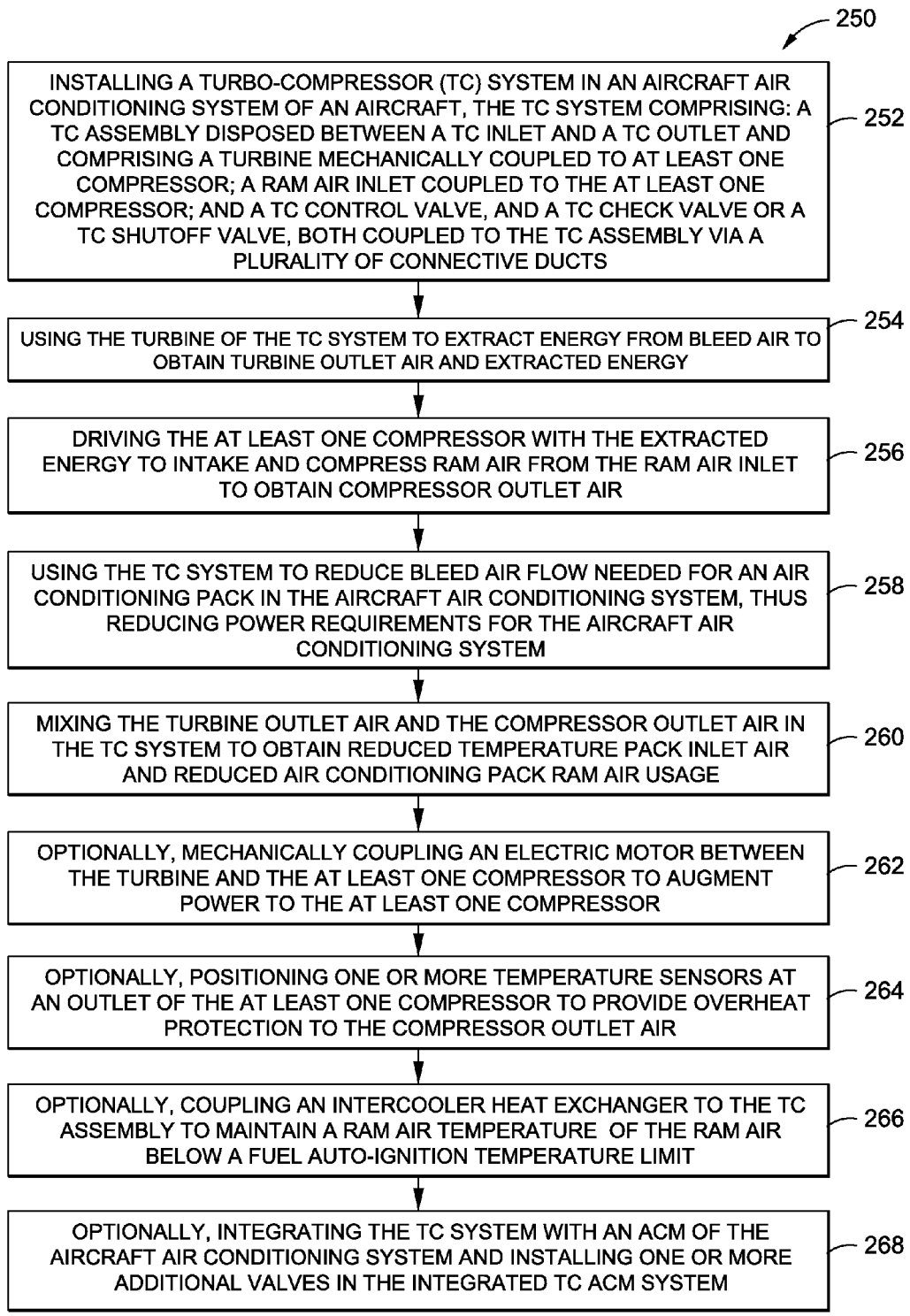
FIG. 9 is an illustration of a flow diagram showing an embodiment of a method of the disclosure.

In another embodiment there is provided a method 250 (see FIG. 9) of extracting energy from an aircraft engine 32 (see FIG. 1A) to obtain or generate extracted energy 238 (see FIG. 8). FIG. 9 is an illustration of a flow diagram showing an embodiment of the method 250 of the disclosure.

The method 250 comprises step 252 of installing a turbo-compressor (TC) system 10 (see FIG. 8) in an aircraft air conditioning system 40 (see FIG. 8) of an aircraft 12 (see FIG. 8). As discussed in detail above, the TC system 10 (see FIGS. 2-8) comprises a turbo-compressor (TC) assembly 11 (see FIGS. 2-8) disposed between a TC inlet 132 (see FIGS. 2-8) and a TC outlet 150 (see FIGS. 2-8), and comprising a turbine 138 (see FIGS. 2-8) mechanically coupled to at least one compressor 144 (see FIGS. 2-8), such as in the form of first compressor (C1) 144a (see FIGS. 2-8).

The TC system 10 (see FIG. 8) further comprises a ram air inlet 58 (see FIG. 8) coupled to the at least one compressor 144 (see FIG. 2). The TC system 10 (see FIG. 8) further comprises a turbo-compressor (TC) control valve 134 (see FIG. 8), and a turbo-compressor (TC) valve 142 (see FIG. 8). The TC valve 142 (see FIG. 8) may be in the form of a turbo-compressor (TC) check valve 142a, a turbo-compressor (TC) shutoff valve 142b (see FIG. 8), or another suitable TC valve. Both the TC control valve 134 (see FIG. 8) and the TC valve 142 (see FIG. 8) (e.g., the TC check valve 142a or the TC shutoff valve 142b) are preferably coupled to the TC assembly 11 (see FIG. 8) via a plurality of connective ducts 131 (see FIG. 8).

As shown in FIG. 9, the method 250 further comprises step 254 of using the turbine 138 (see FIG. 8) of the TC system 10 (see FIG. 8) to extract energy from bleed air 60 (see FIG. 8) from a bleed air system 34 (see FIG. 8) in an aircraft engine 32 (see FIG. 8) to obtain turbine outlet air 152 (see FIG. 8) and extracted energy 238 (see FIG. 8).

As shown in FIG. 9, the method 250 further comprises step 256 of driving the at least one compressor 144 (see FIG. 2) with the extracted energy 238 (see FIG. 8) to intake and compress ram air 60 (see FIG. 8) from the ram air inlet 58 (see FIG. 8) to obtain compressor outlet air 154 (see FIG. 2). Alternatively, the step 256 of driving the at least one compressor 144 (see FIG. 2) with the extracted energy 238 (see FIG. 8) to intake and compress ram air 60 (see FIG. 8) from the ram air inlet 58 (see FIG. 8) may be substituted with the step of driving the at least one compressor 144 (see FIG. 8) with the extracted energy 238 (see FIG. 8) to intake and compress recirculated cabin air 172 (see FIG. 6) from an aircraft cabin 14 (see FIG. 6) through a recirculated cabin air duct 174 (see FIG. 6) to obtain compressor outlet air 155a (see FIG. 6).

As shown in FIG. 9, the method 250 further comprises step 258 of using the TC system 10 (see FIG. 8) to reduce bleed air flow 236 (see FIG. 8) (and bleed air pressure 234 (see FIG. 8)) needed for an AC pack 42 (see FIG. 8) in the aircraft air conditioning system 40 (see FIG. 8), thus reducing power requirements 232 (see FIG. 8) for the aircraft air conditioning system 40 (see FIG. 8). The step 258 of using the TC system 10 (see FIG. 8) to reduce bleed air flow 236 (see FIG. 8) and bleed air pressure 234 (see FIG. 8) may further comprise simultaneously opening both a pressure regulating shutoff valve (PRSOV) 92 (see FIG. 2) and an over pressure valve (OPV) 108 (see FIG. 2) in the bleed air system 34 (see FIGS. 2, 8).

As shown in FIG. 9, the method 250 further comprises step 260 of mixing the turbine outlet air 152 (see FIG. 8) and the compressor outlet air 154 (see FIG. 8) (or compressor outlet air 176b (see FIG. 6)) in the TC system 10 (see FIG. 8) to obtain a reduced temperature pack inlet air 156 (see FIG. 8) and a reduced air conditioning pack ram air usage 157 (see FIG. 8).

As shown in FIG. 9, the method 250 may further comprise optional step 262 of mechanically coupling an electric motor 164 (see FIG. 4) between the turbine 138 (see FIG. 4) and the at least one compressor 144 (see FIG. 4) to augment power to the at least one compressor 144 (see FIG. 4), and more particularly, to augment power to the first compressor (C1) 144a (see FIG. 4).

As shown in FIG. 9, the method 250 may further comprise optional step 264 of positioning one or more temperature sensors 148 (see FIG. 2) at a compressor outlet 162 (see FIG. 2) of the at least one compressor 144 (see FIG. 2) to provide overheat protection of the compressor outlet air 154 (see FIG. 4) or compressor outlet air 176b (see FIG. 6).

As shown in FIG. 9, the method 250 may further comprise optional step 266 of coupling an intercooler heat exchanger 166 (see FIG. 5) to the TC assembly 10 to maintain a ram air temperature 62 (see FIG. 8) of the ram air 60 (see FIG. 8) below a fuel auto-ignition temperature limit.

As shown in FIG. 9, the method 250 may further comprise optional step 268 of integrating the TC system 10 with an air cycle machine (ACM) 45 (see FIGS. 7A, 8) of the aircraft air conditioning system 40 (see FIGS. 7A, 8) and installing one or more additional valves 181 (see FIG. 8), such as a TC check valve 202 (see FIG. 7A) and a TC control valve (TCCV) 214 (see FIG. 7A), in the integrated turbo-compressor ACM system 180 (see FIG. 7A).

The method 250 may further comprise optional step of controlling flow of the reduced temperature pack inlet air 156 (see FIG. 8) from the TC system 10 (see FIG. 8) into the aircraft air conditioning pack 42 (see FIG. 8) by opening the TC control valve (TCCV) 134 (see FIG. 8) and closing a pack flow control valve 130 (see FIG. 2) for the AC pack 42 (see FIG. 2).

Figure 10:
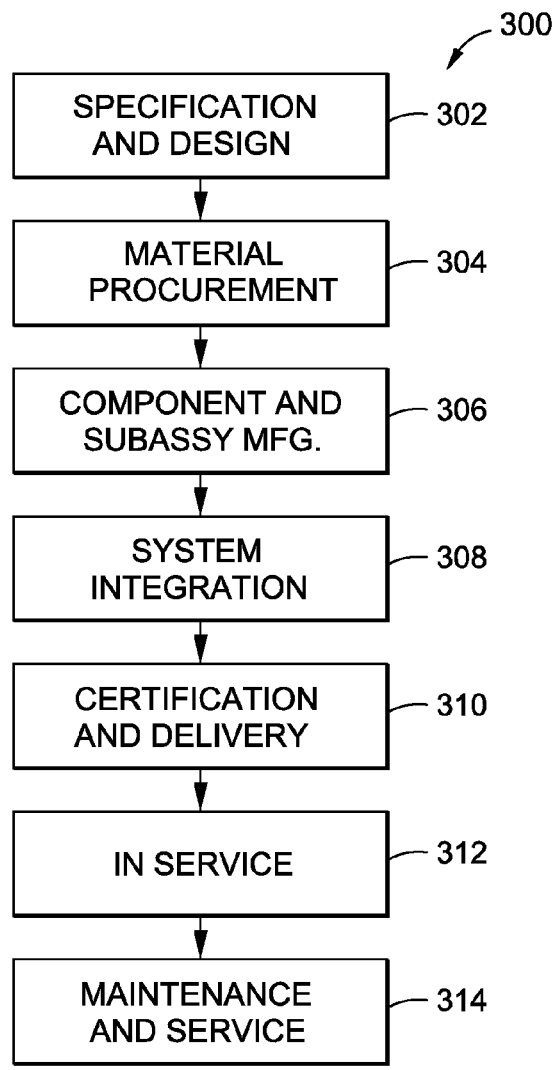
FIG. 10 is an illustration of a flow diagram of an aircraft production and service method; and, FIG. 11 is an illustration of a block diagram of an aircraft.
Figure 11:
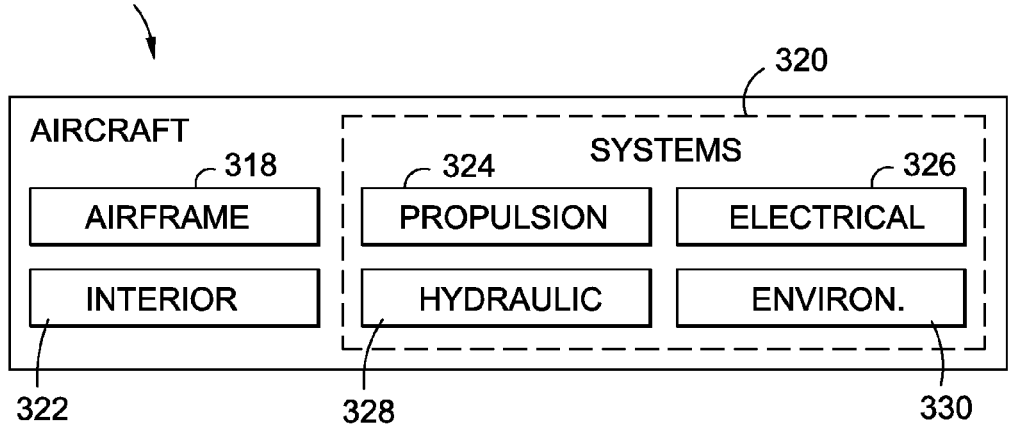

FIG. 10 is an illustration of a flow diagram of an aircraft production and service method 300. FIG. 11 is an illustration of a block diagram of an aircraft 316. Referring to FIGS. 10-11, embodiments of the disclosure may be described in the context of the aircraft production and service method 300, as shown in FIG. 10, and the aircraft 316, as shown in FIG. 11. During pre-production, exemplary aircraft production and service method 300 may include specification and design 302 of the aircraft 316 and material procurement 304. During production, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 which may also include modification, reconfiguration, refurbishment, and other suitable services.

Each of the processes of the aircraft production and service method 300 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 11, the aircraft 316 produced by exemplary aircraft production and service method 300 may include an airframe 318 with a plurality of high-level systems 320 and an interior 322. Examples of the plurality of high-level systems 320 may include one or more of a propulsion system 324, an electrical system 326, a hydraulic system 328, and an environmental system 330. Any number of other systems may also be included. Although an aerospace example is shown, the principles of the invention may be applied to other industries, such as the automotive industry.

Methods and systems embodied herein may be employed during any one or more of the stages of the production and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to routine maintenance and service 314.

Disclosed embodiments of the turbo-compressor (TC) system 10, 10a-10f (see FIGS. 2-7B) and method 250 (see FIG. 9) provide a means to control bleed air flow 236 (see FIG. 8) into the AC pack 42 (see FIGS. 2-8) while significantly reducing engine % SFC (percentage specific fuel consumption) and saving ram air drag. The TC system 10 (see FIGS. 2-7B) with the TC assembly 11 (see FIGS. 2-7B) uses the turbine 138 (see FIGS. 2-7B) to pull energy from the bleed air 50 (see FIGS. 2-7B) to reduce bleed air flow 236 (see FIG. 8) and bleed air pressure 234 (see FIG. 8) needed for the AC pack 42 (see FIGS. 2-7B), and to take the extracted energy 238 (see FIG. 8) from the turbine 138 (see FIGS. 2-7B) to pull in ram air 60 (see FIGS. 2-5, 7B) and mix with turbine outlet air 152 (see FIGS. 2-5, 7B) to generate reduced temperature pack inlet air 156 (see FIGS. 2-3) entering the AC pack 42 (see FIGS. 2-3).

The TC system 10 (see FIGS. 2-8) allows for the reduction of the bleed air flow 236 (see FIG. 8) required to satisfy pack air flow requirements 230 (see FIG. 8). Reduction of bleed air flow 236 (see FIG. 8) directly translates to engine % SFC (percentage specific fuel consumption) savings. For example, for a wide body aircraft, the TC system 10 may provide a % SFC (percentage specific fuel consumption) savings of 0.3%-0.4%.

The TCCV 134 (see FIGS. 2-7B) modulation provides real time pneumatic power 242 (see FIG. 8) extraction optimization and net bleed air 50 (see FIGS. 2-7B) savings and real time optimized % SFC (specific fuel consumption) savings. Preferably, when the TC system 10 (see FIGS. 2-3) is in an operating mode, it is desirable to also have the pressure regulating shutoff valve (PRSOV) 92 (see FIGS. 2-7B) and the over pressure valve (OPV) 108 (see FIGS. 2-7) of the bleed air system 34 (see FIGS. 2-7B) both open as much as possible to minimize or prevent the PRSOV 92 and the OPV 108 from modulating and dropping the pressure of the bleed air 50 (see FIGS. 2-7B), so as to maximize the bleed air pressure 234 (see FIG. 8) of the bleed air 50 to the TC system 10 and to minimize any wasted energy.

In addition, disclosed embodiments of the turbo-compressor (TC) system 10, 10a-10f (see FIGS. 2-7B) and method 250 (see FIG. 9) provide a means to align the pneumatic power 242 (see FIG. 8) provided by the aircraft engines 32 (see FIGS. 1A-8) with the power requirements 232 (see FIG. 8) of the aircraft air conditioning system 40 (see FIGS. 1A-8), thereby reducing any wasted energy. Preferably, the TC system 10 (see FIGS. 2-7B) reduces the extracted energy 238 (see FIG. 8) to exactly the power requirements 232 (see FIG. 8) or amount of energy required by the aircraft air conditioning system 40 (see FIGS. 2-8).

Further, disclosed embodiments of the turbo-compressor (TC) system 10, 10a-10f (see FIGS. 2-7B) and method 250 (see FIG. 9) reduce the pack inlet air temperature, thereby reducing pack heat exchanger (HX) 44 (see FIGS. 2-5) ram air flows, which in turn, reduces AC pack 42 (see FIGS. 2-5) ram air usage, resulting in a reduced AC pack ram air usage 157 (see FIG. 8) and reduced ram air drag. Thus, the TC system 10 (see FIGS. 2-5) provides AC pack 42 (see FIGS. 2-5) ram air drag savings and engine fan air 103 (see FIGS. 2-5) savings.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A turbo-compressor (TC) system for extracting energy from an aircraft engine, the turbo-compressor system comprising:

a turbo-compressor assembly comprising a turbine mechanically coupled to at least one compressor;

a turbo-compressor inlet in fluid communication with a bleed air system in the aircraft engine, to intake bleed air from the bleed air system into the turbo-compressor assembly;

a turbo-compressor outlet in fluid communication with an air conditioning pack of an aircraft air conditioning system, to extract reduced temperature pack inlet air from the turbo-compressor assembly directly into the air conditioning pack, the reduced temperature pack inlet air comprising one of, a mixture of turbine outlet air and compressor outlet air, and a mixture of turbine outlet air, compressor outlet air, and bleed air through a pack flow control valve for the air conditioning pack, the air conditioning pack being separate from the turbo-compressor assembly and further cooling the reduced temperature pack inlet air, and the air conditioning pack being coupled to a pack heat exchanger having one or more heat exchangers;

the at least one compressor coupled to at least one of, a ram air inlet to intake ram air by the at least one compressor, and a recirculated cabin air duct to intake recirculated cabin air from an aircraft cabin by the at least one compressor; and, a turbo-compressor control valve, and a turbo-compressor check valve or a turbo-compressor shutoff valve, both coupled to the turbo-compressor assembly via a plurality of connective ducts, wherein the turbo-compressor system extracts energy from the bleed air.

2. The turbo-compressor system of claim 1 further comprising an electric motor mechanically coupled between the turbine and the at least one compressor, the electric motor augmenting power to the at least one compressor.

3. The turbo-compressor system of claim 1 further comprising one or more temperature sensors positioned at a compressor outlet of the at least one compressor, the one or more temperature sensors providing overheat protection of compressor outlet air.

4. The turbo-compressor system of claim 1 wherein the turbo-compressor assembly comprises a first compressor and a second compressor.

5. The turbo-compressor system of claim 4 further comprising an intercooler heat exchanger coupled between the first compressor and the second compressor, the intercooler heat exchanger maintaining a ram air temperature of the ram air below a fuel auto-ignition temperature limit.

6. The turbo-compressor system of claim 4 wherein the first compressor is coupled to one of, the ram air inlet, and the recirculated cabin air duct.

7. The turbo-compressor system of claim 1 wherein the turbo-compressor system operates in parallel with a pack flow control valve for the air conditioning pack.

8. The turbo-compressor system of claim 1 wherein the turbine has a turbine inlet for receiving the bleed air and extracts the energy from the bleed air passing through the turbine, to generate power to drive the at least one compressor.

9. The turbo-compressor system of claim 1 wherein the turbo-compressor system is coupled to the air conditioning pack having an air cycle system.

10. The turbo-compressor system of claim 1 wherein the ram air inlet comprises a ram air inlet scoop or a ram air inlet bypass duct integral with a ram air system of an aircraft.

11. The turbo-compressor system of claim 1 wherein the turbo-compressor system extracts energy from the bleed air to reduce bleed air flow needed for the air conditioning pack, resulting in reduced power requirements for the aircraft air conditioning system and reduced air conditioning pack ram air usage.

12. An aircraft comprising:
at least one wing;
one or more aircraft engines coupled to the at least one wing, each aircraft engine having a bleed air system for generating bleed air;
a fuselage defining an interior volume having an aircraft cabin and a pack bay separate from the aircraft cabin;
an aircraft air conditioning system positioned in the pack bay and in fluid communication with the aircraft cabin, the aircraft air conditioning system comprising:
an air conditioning pack; and,
a turbo-compressor (TC) system comprising:
a turbo-compressor assembly comprising a turbine mechanically coupled to at least one compressor;
a turbo-compressor inlet in fluid communication with the bleed air system, to intake bleed air from the bleed air system into the turbo-compressor assembly;
a turbo-compressor outlet in fluid communication with the air conditioning pack, to extract reduced temperature pack inlet air from the turbo-compressor assembly directly into the air conditioning pack, the reduced temperature pack inlet air comprising one of, a mixture of turbine outlet air and compressor outlet air, and a mixture of turbine outlet air, compressor outlet air, and bleed air through a pack flow control valve for the air conditioning pack, the air conditioning pack being separate from the turbo-compressor assembly and further cooling the reduced temperature pack inlet air, and the air conditioning pack being coupled to a pack heat exchanger having one or more heat exchangers;
the at least one compressor coupled to at least one of, a ram air inlet to intake ram air by the at least one compressor, and a recirculated cabin air duct to intake recirculated cabin air from the aircraft cabin by the at least one compressor; and,
a turbo-compressor control valve, and a turbo-compressor check valve or a turbo-compressor shutoff valve, both coupled to the turbo-compressor assembly via a plurality of connective ducts,
wherein the turbo-compressor system extracts energy from the bleed air.

13. The aircraft of claim 12 wherein the turbo-compressor system further comprises one or more of an electric motor mechanically coupled between the turbine and the at least one compressor; one or more temperature sensors positioned at a compressor outlet of the at least one compressor; and an intercooler heat exchanger coupled to the at least one compressor.

14. The aircraft of claim 12 wherein the turbo-compressor assembly comprises a first compressor and a second compressor, and the first compressor is coupled to one of, the ram air inlet, and the recirculated cabin air duct.

15. The aircraft of claim 12 wherein the turbo-compressor system is coupled to the air conditioning pack having an air cycle system.

16. The aircraft of claim 12 wherein the turbo-compressor system extracts energy from the bleed air to reduce bleed air flow needed for the air conditioning pack, resulting in reduced power requirements for the aircraft air conditioning system and reduced air conditioning pack ram air usage.

17. A method of extracting energy from an aircraft engine, the method comprising the steps of:
installing a turbo-compressor (TC) system in an aircraft air conditioning system of an aircraft, the turbo-compressor system comprising:
a turbo-compressor assembly disposed between a turbo-compressor inlet and a turbo-compressor outlet and comprising a turbine mechanically coupled to at least one compressor;
the turbo-compressor inlet in fluid communication with a bleed air system in the aircraft engine, to intake bleed air from the bleed air system into the turbo-compressor assembly;
the turbo-compressor outlet in fluid communication with an air conditioning pack of an aircraft air conditioning system, to extract reduced temperature pack inlet air from the turbo-compressor assembly directly into the air conditioning pack, the reduced temperature pack inlet air comprising one of, a mixture of turbine outlet air and compressor outlet air, and a mixture of turbine outlet air, compressor outlet air, and bleed air through a pack flow control valve for the air conditioning pack, the air conditioning pack being separate from the turbo-compressor assembly and further cooling the reduced temperature pack inlet air to provide pressurization, ventilation, and temperature control to the aircraft, and the air conditioning pack being coupled to a pack heat exchanger having one or more heat exchangers;

the at least one compressor coupled to at least one of, a ram air inlet, and a recirculated cabin air duct; and, a turbo-compressor control valve, and a turbo-compressor check valve or a turbo-compressor shutoff valve, both coupled to the turbo-compressor assembly via a plurality of connective ducts;

using the turbine of the turbo-compressor system to extract energy from the bleed air to obtain turbine outlet air and extracted energy;

driving the at least one compressor with the extracted energy to intake and compress one of, ram air from the ram air inlet to obtain compressor outlet air, and recirculated cabin air from an aircraft cabin through a recirculated cabin air duct to obtain compressor outlet air;

using the turbo-compressor system to reduce bleed air flow needed for the air conditioning pack in the aircraft air conditioning system, thus reducing power requirements for the aircraft air conditioning system; and, mixing the turbine outlet air and the compressor outlet air in the turbo-compressor system to obtain the reduced temperature pack inlet air and a reduced air conditioning pack ram air usage.

18. The method of claim 17 further comprising the step of mechanically coupling an electric motor between the turbine and the at least one compressor to augment power to the at least one compressor.

19. The method of claim 17 further comprising the step of positioning one or more temperature sensors at a compressor outlet of the at least one compressor to provide overheat protection of the compressor outlet air.

20. The method of claim 17 further comprising the step of coupling an intercooler heat exchanger to the turbo-compressor assembly to maintain a ram air temperature of the ram air below a fuel auto-ignition temperature limit.

21. The method of claim 17 wherein the step of installing the turbo-compressor system in the aircraft air conditioning system of the aircraft comprises coupling the turbo-compressor system to the air conditioning pack having an air cycle system.

22. The method of claim 17 wherein the step of installing the turbo-compressor (TC) system comprises installing the turbo-compressor (TC) system having the turbo-compressor assembly with a first compressor and a second compressor, the first compressor coupled to one of, the ram air inlet, and the recirculated cabin air duct.

23. The method of claim 17 further comprising the step of controlling flow of the reduced temperature pack inlet air from the turbo-compressor system into the air conditioning pack by opening the turbo-compressor control valve and closing one or more pack flow control valves for the air conditioning pack.

24. The method of claim 17 wherein the step of using the turbo-compressor system to reduce bleed air flow further comprises simultaneously opening both a pressure regulating shutoff valve and an over pressure valve in the bleed air system.

* * * * *